(12) United States Patent
Lu et al.

(10) Patent No.: US 9,423,248 B2
(45) Date of Patent: Aug. 23, 2016

(54) VISUAL ERROR CALIBRATION METHOD

(71) Applicant: Industrial Technology Research Institute, Hsinchu (TW)

(72) Inventors: Shao-Chuan Lu, Changhua County (TW); Jie-Ting Tseng, Tainan (TW); Min-Kai Lee, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 242 days.

(21) Appl. No.: 14/228,274

(22) Filed: Mar. 28, 2014

(65) Prior Publication Data

US 2014/0333931 A1 Nov. 13, 2014

(30) Foreign Application Priority Data

May 10, 2013 (TW) .............................. 102116750 A

(51) Int. Cl.
*G01B 11/00* (2006.01)
*G01B 11/14* (2006.01)
(Continued)

(52) U.S. Cl.
CPC .................................. *G01B 11/272* (2013.01)

(58) Field of Classification Search
CPC ..... G01B 11/27; G01B 11/14; G01B 11/002; G01B 11/005; G01B 11/272; G01B 11/03; G01B 21/021; G01B 21/0212; G01B 21/045; G01B 21/042; B23K 26/042; B23K 26/0869; B23K 26/0876; B23K 26/083; B23K 26/0853; B23K 26/04; B23K 26/046; B23K 26/043; B23K 26/082

USPC ............ 702/95, 94; 356/614, 615, 620, 399, 356/400, 153, 139.04–139.08, 401; 382/151

See application file for complete search history.

(56) References Cited

U.S. PATENT DOCUMENTS 6,501,061 B1 12/2002 Kitai et al.
6,545,250 B2 4/2003 Hartmann et al.
(Continued)

FOREIGN PATENT DOCUMENTS

CN 1333713 1/2002
CN 1124916 10/2003
(Continued)

OTHER PUBLICATIONS

Stache et al., "Automatic Calibration of a Scanner-Based Laser Welding System," International Congress on the Applications of Lasers and Electro-Optics, Nov. 2007, pp. 223-229.
(Continued)

*Primary Examiner* — Tarifur Chowdhury
*Assistant Examiner* — Sunghee Y Gray
(74) *Attorney, Agent, or Firm* — Jianq Chyun IP Office

(57) ABSTRACT

A visual error calibration method configured to calibrate visual positioning errors of a laser processing apparatus is provided. The method includes: providing an alignment mark having at least one alignment point; locating a preset point of the alignment mark at a first preset position of a working area, and locating a preset image point at a preset position of the visible area; locating the alignment point at one of the second preset positions in the working area; adjusting parameters of a scanning module to locate an alignment image point at the preset position; relatively moving the alignment image point to positions of the visible area in sequence; recording the positions of the alignment image point in the visible area, the positions of the alignment point in the working area and the parameters of the scanning module, so as to produce an alignment table.

16 Claims, 20 Drawing Sheets

(51) Int. Cl.
    *G01B 11/26*     (2006.01)
    *G01C 17/38*     (2006.01)
    *G06K 9/00*     (2006.01)
    *G01B 11/27*     (2006.01)

(56) References Cited

U.S. PATENT DOCUMENTS

| | | |
|---|---|---|
| 6,615,099 B1 | 9/2003 | Muller et al. |
| 6,720,567 B2 * | 4/2004 | Fordahl .............. B23K 26/048 |
| | | 219/121.83 |
| 7,015,418 B2 | 3/2006 | Cahill et al. |
| 7,203,618 B2 * | 4/2007 | Hammerschmidt ... G01B 21/22 |
| | | 702/150 |
| 8,000,831 B2 | 8/2011 | Benayad-Cherif |
| 2005/0205778 A1 | 9/2005 | Kitai et al. |
| 2007/0173792 A1 | 7/2007 | Arnoldussen |
| 2010/0292947 A1 | 11/2010 | Buk |

FOREIGN PATENT DOCUMENTS

| | | |
|---|---|---|
| CN | 1650428 | 8/2005 |
| CN | 101359204 | 2/2009 |
| CN | 101815156 | 8/2010 |
| CN | 101909827 | 12/2010 |
| CN | 102067172 | 5/2011 |
| CN | 102142503 | 8/2011 |
| CN | 102449863 | 5/2012 |
| DE | 19831340 | 3/2000 |
| DE | 112008002862 | 12/2010 |
| EP | 1097022 A1 | 5/2001 |
| EP | 1097022 B1 | 9/2003 |
| JP | 2002520165 | 7/2002 |
| KR | 20100106311 | 10/2010 |
| TW | 315690 | 9/1997 |
| TW | 436356 | 5/2001 |
| TW | 200628253 | 8/2006 |
| TW | I264218 | 10/2006 |
| TW | I277478 | 4/2007 |
| TW | I290363 | 11/2007 |
| TW | 200922724 | 6/2009 |
| TW | 201127530 | 8/2011 |
| TW | I359715 | 3/2012 |
| TW | 201325792 | 7/2013 |
| WO | 0003833 | 1/2000 |
| WO | 2009054811 | 4/2009 |

OTHER PUBLICATIONS

Yang and Lin, "The Design of Coaxial Laser Vision System," 2010 Automatic Optical Inspection Equipment Association Forum & Show, Oct. 2010, pp. 1-8.

Shiuan-Teng Hung, "Laser Precision Micromachining with Adaptive Optics System," Thesis of Master Degree, National Cheng Kung University Department of Engineering Science, Jun. 2008, pp. 1-75.

Junfei et al., "Coaxial monitoring with a CMOS camera for CO2 laser welding," Proceedings of SPIE, Advanced Materials and Devices for Sensing and Imaging II, Jan. 27, 2005, pp. 101-109.

Mei Chu, Abstract of "The Design of Imaging Lens for Coaxial Laser Scanning and Visual Inspection Techniques," Thesis of Master Degree, Mingdao Univeristy, Department of Electro-Optical and Energy Engineering, 2010, pp. 1-2.

* cited by examiner

VISUAL ERROR CALIBRATION METHOD

CROSS-REFERENCE TO RELATED APPLICATION

This application claims the priority benefit of Taiwan application serial no. 102116750, filed on May 10, 2013. The entirety of the above-mentioned patent application is hereby incorporated by reference herein and made a part of this specification.

TECHNICAL FIELD

The disclosure relates to a calibration method, and more particularly, to a visual error calibration method.

BACKGROUND

In advanced material processing and precision processing, the conventional processing techniques are no longer sufficient to meet the demands, instead such processes rely heavily on laser microprocessing technique in order to cope with the process demands. In precision processing, visual positioning is one of the means for precision processing.

In general, the control method for a laser processing system with a galvanometer is to employ a reflective mirror to vary an incident angle of a laser light beam, so that the laser light beam is controlled at a pre-processing position of a workpiece. A processing object is capable of forming an image on a charge-coupled device (CCD) in cooperation with coaxial vision technique in order to achieve visual positioning. Since the wavelength ranges of the laser light beam and a visible light beam are different, the optical axis of the laser light beam is caused to be different from the optical axis of the visible light beam, such that optical path error or other potential errors are generated. These errors may cause the image on the charge-coupled device to generate visual errors, thereby reducing the precision of visual positioning.

Thus, visual error of laser coaxial vision module has become one of the concerns for researchers of the related field.

SUMMARY

One of exemplary embodiments comprises a visual error calibration method configured to calibrate a plurality of visual positioning errors of a laser processing apparatus. The visual error calibration method includes: providing an alignment mark, in which the alignment mark has at least one alignment point; locating a preset point of the alignment mark at a first preset position of a working area, forming an alignment mark image on a visible area of an image sensing unit corresponding to the alignment mark, and locating a preset image point formed by the preset point on the visible area at a preset position of the visible area, in which the working area has a plurality of second preset positions; locating the at least one alignment point of the alignment mark at one of the second preset positions; adjusting a plurality of parameters of a scanning module to cause an alignment image point formed by the at least one alignment point on the visible area to locate at the preset position of the visible area, and recording the parameters of the scanning module; relatively moving the alignment image point to a plurality of positions on the visible area in sequence, and respectively recording the positions of the alignment image point in the visible area, the positions of the alignment point in the working area and the parameters of the scanning module, so as to produce an alignment table belonging to the working area.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
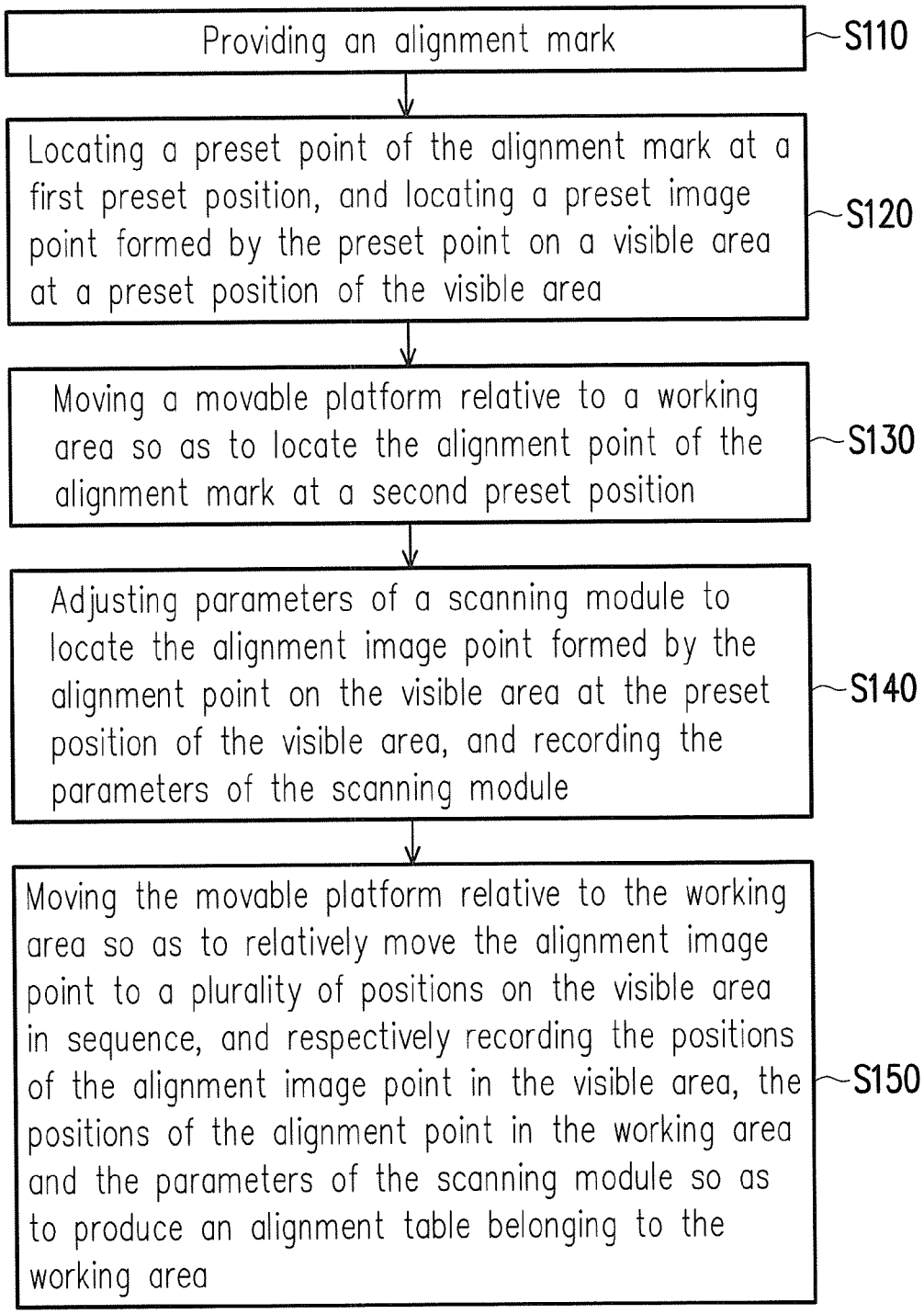
FIG. 1 is a flowchart diagram illustrating a visual error calibration method according to an exemplary embodiment.
Figure 2:
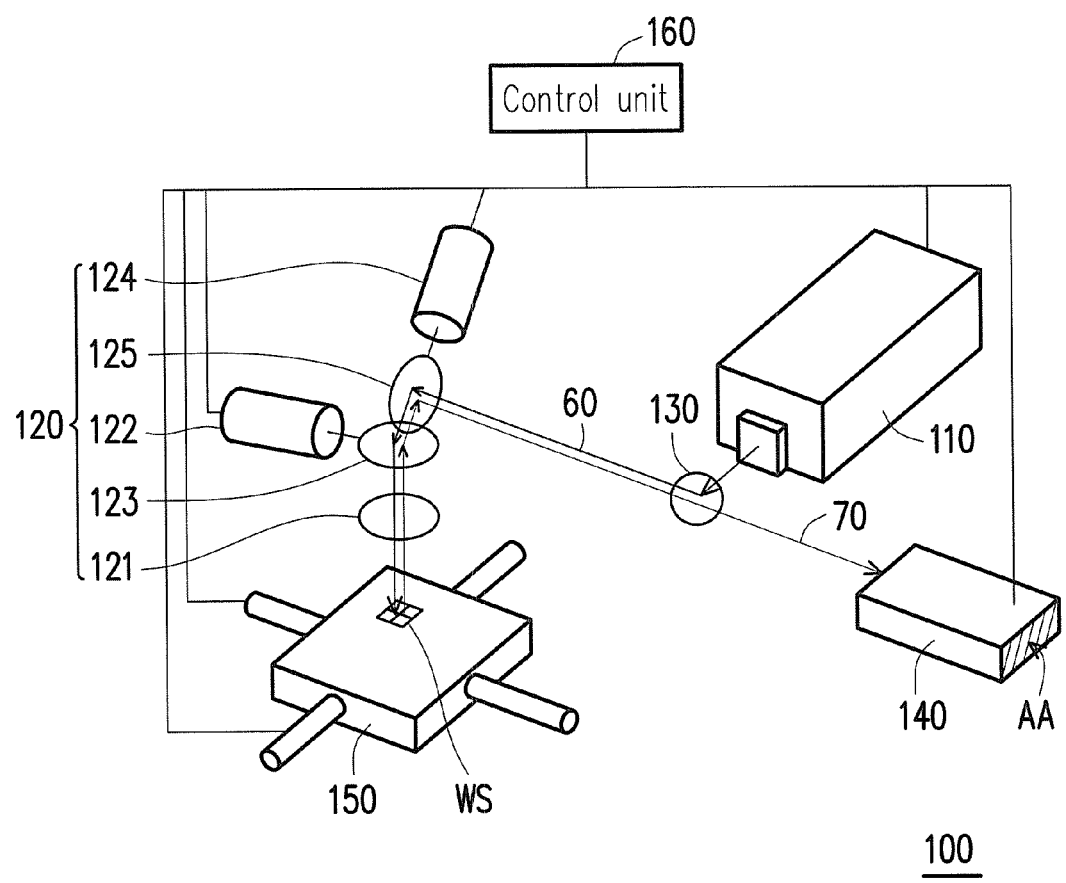
FIG. 2 is a structural schematic diagram illustrating a laser processing apparatus according to an exemplary embodiment.

FIG. 1 is a flowchart diagram illustrating a visual error calibration method according to an exemplary embodiment. FIG. 2 is a structural schematic diagram illustrating a laser processing apparatus according to an exemplary embodiment. Referring to FIG. 1, in the embodiment, the visual error calibration method may employ the laser processing apparatus 100 depicted in FIG. 2 to implement, although the disclosure is not limited thereto. Alternatively, the visual error calibration method may also be implemented through a computer program product (that includes program instructions for executing the visual error calibration method) loaded into the laser processing apparatus 100 depicted in FIG. 2 and relative hardware thereof, although the disclosure is not limited thereto. In the embodiment, the visual error calibration method may be configured to calibrate a plurality of visual positioning errors of a laser processing apparatus 100, and such method includes the following steps: first of all, executing step S110, that is, providing an alignment mark AP in which the alignment mark AP has at least one alignment point A. The method of executing step S110 will be described in detail below with FIG. 3A through FIG. 3C.

Figure 3A:
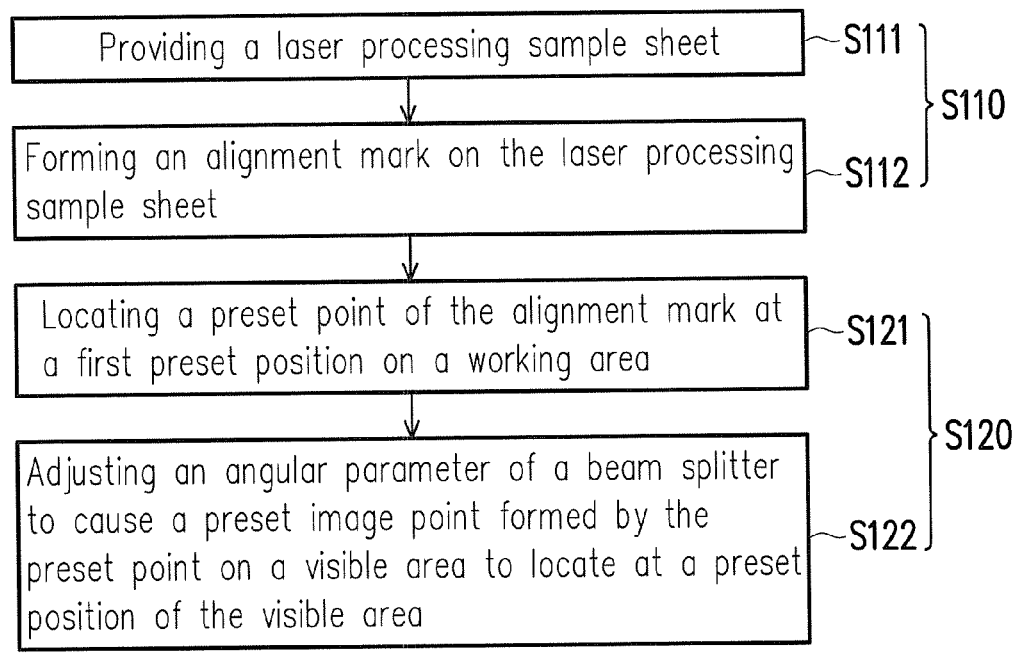
FIG. 3A is a flowchart diagram illustrating a part of the visual error calibration method depicted in FIG. 1.
Figure 3B:
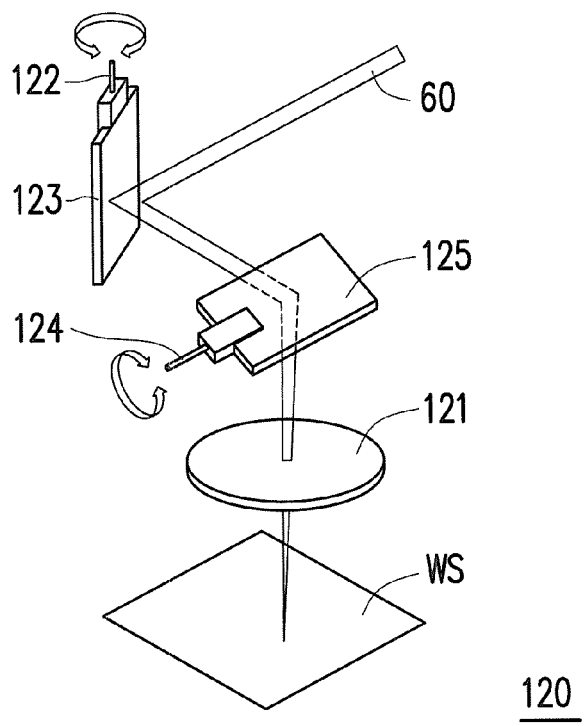
FIG. 3B is a structural schematic diagram illustrating a scanning module depicted in FIG. 2.
Figure 3C:
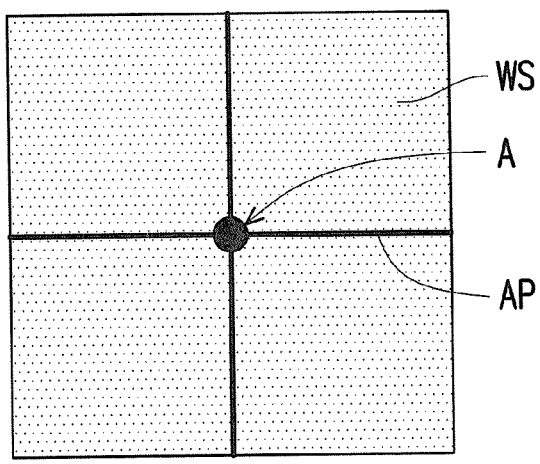
FIG. 3C is a schematic front view diagram illustrating an alignment mark depicted in FIG. 3A.

FIG. 3A is a flowchart diagram illustrating a part of the visual error calibration method depicted in FIG. 1. FIG. 3B is a structural schematic diagram illustrating a scanning module depicted in FIG. 2. FIG. 3C is a schematic front view diagram illustrating an alignment mark depicted in FIG. 3A. Referring to FIG. 3A through FIG. 3C, step S111 is firstly executed to provide a laser processing sample sheet WS and ensure that the laser processing sample sheet WS is located within a working area WA. Then, step S112 is executed to form an alignment mark AP on the laser processing sample sheet WS. Specifically, in the embodiment, the method of forming the alignment mark AP may utilize a laser beam 60 emitted from a laser light source 110 of the laser processing apparatus 100 depicted in FIG. 2 to process on the laser processing sample sheet WS. To be specific, the step of processing the laser processing sample sheet WS in the embodiment may employ a scanning module 120 (e.g. a galvanometer scanning module) depicted in FIG. 3B to implement. To be more specific, the scanning module 120 is located on a transmission path of the laser beam 60, and includes a focus mirror 121 and two reflective mirrors 123, 125, in which the reflective mirrors 123 and 125 are respectively connected to two rotators 122 and 124. The rotators 122, 124 are capable of rotating the reflective mirrors 123 and 125 and accordingly bending and reflecting the laser beam 60. For example, the rotators 122, 124 are galvanometric motors, although the disclosure is not limited thereto. The laser beam 60 is focused onto the working area WA through the focus mirror 121 after being reflected by the scanning module 120 to process the laser processing sample sheet WS, so as to form the alignment mark AP.

As shown in FIG. 3C, the mark of the alignment mark AP in the embodiment is a crisscross shape, although the disclosure is not limited thereto. In other embodiments, the alignment mark AP may also be a circular shape, a polygonal shape or any other easy-identified shapes. In addition, the quantity of the alignment point A is one and the alignment point A may be the center of the alignment mark AP, although the disclosure is not limited thereto. In other applicable embodiments, the alignment point A may have more than one and may also be other parts of the alignment mark AP. Those skilled persons in the art can design the alignment point A according to an actual requirement, which is not repeated therein.

Subsequently, referring to FIG. 1 again, step S120 is executed to locate a preset point C of the alignment mark AP at a first preset position O of the working area WA, and to locate a preset image point CI formed by the preset point C on a visible area AA at a preset position AO of the visible area AA. The method of executing step S120 will be described in detail below with FIG. 3A and FIG. 3D through FIG. 3E.

Figure 3D:
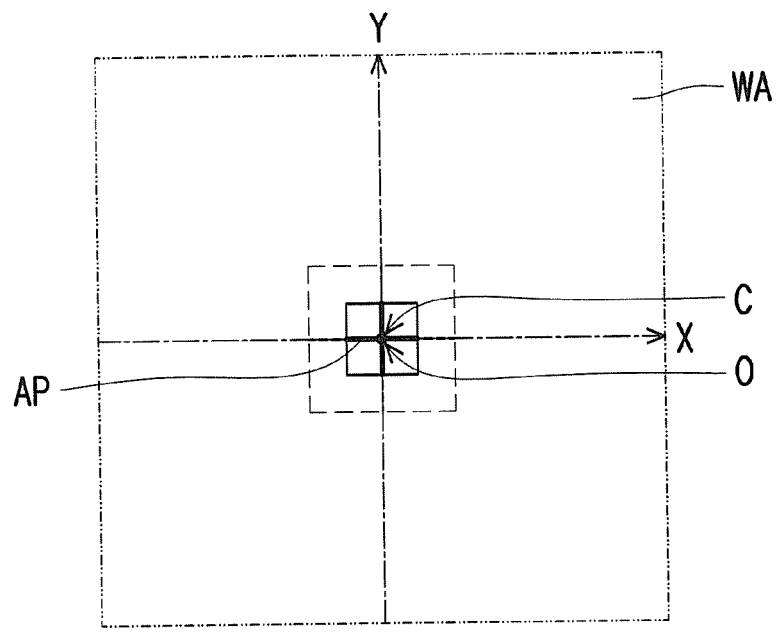
FIG. 3D is a schematic front view diagram illustrating a working area depicted in FIG. 3A.
Figure 3E:
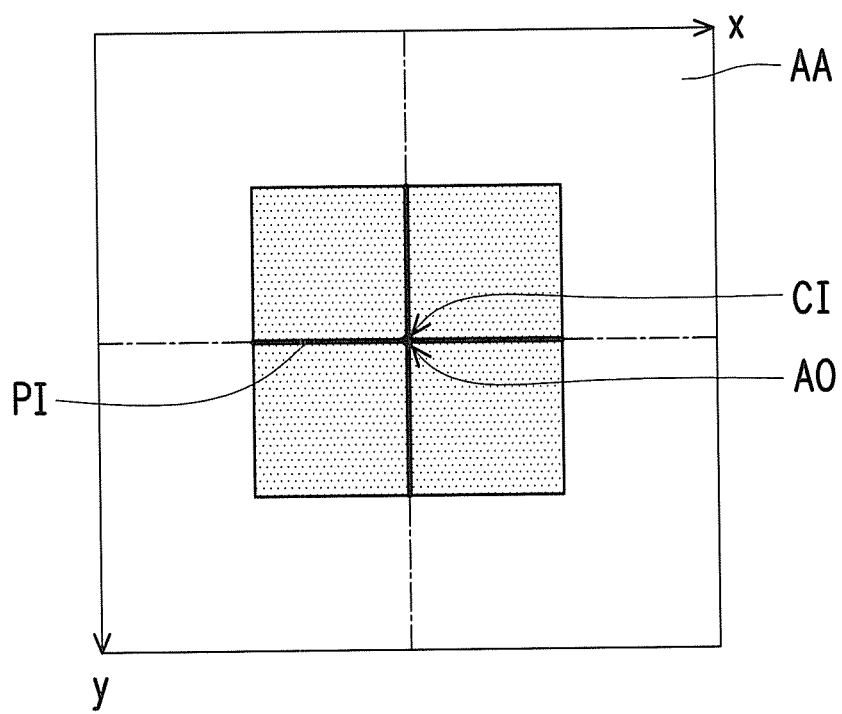
FIG. 3E is a schematic front view diagram illustrating an alignment mark image depicted in FIG. 3A being located at a visible area.

FIG. 3D is a schematic front view diagram illustrating a working area depicted in FIG. 3A. FIG. 3E is a schematic front view diagram illustrating an alignment mark image depicted in FIG. 3A being located at a visible area. Referring to FIG. 3A and FIG. 3D, step S121 is executed to locate a preset point C of the alignment mark AP at the first preset position O of the working area WA. In the embodiment, the preset point C and the first preset position O may respectively be the centers of the alignment mark AP and the working area WA, although the disclosure is not limited thereto. Those skilled persons in the art can set the positions of the preset point C and the first preset position O according to an actual requirement, which is not repeated therein.

Subsequently, referring to FIG. 3D and FIG. 3E, step S122 is executed to adjust an angular parameter of a beam splitter 130 to cause the preset image point CI formed by the preset point C on the visible area AA to locate at the preset position AO of the visible area AA. Specifically, in the embodiment, step S122 may be implemented by adjusting the beam splitter 130 of the laser processing apparatus 100 depicted in FIG. 2. To be specific, as shown in FIG. 2, the beam splitter 130 of the laser processing apparatus 100 is located on the transmission path of the laser beam 60, in which the visible light 70 may be transmitted to an image sensing unit 140 of the laser processing apparatus 100 through the beam splitter 130, the alignment mark AP here forms an alignment mark image PI on the visible area AA of the image sensing unit 140 and the preset point C may form the preset image point CI on the visible area AA of the image sensing unit 140. By adjusting the angular parameter of the beam splitter 130, the preset image point CI may be located at the preset position AO of the visible area AA. Additionally, in the embodiment, it should be noted that the resolution of the visible area AA may be 640×480 pixels and the preset position AO may be the center of the visible area AA, namely, the coordinate position (320, 340), although the disclosure is not limited thereto. In other embodiments, the size of the visible area AA may be 900×900 pixels or other suitable pixel ranges of resolution, and the preset position AO may also not be the center of the visible area AA. Those skilled persons in the art can set the resolution of the visible area AA and select the position of the preset position AO according to an actual requirement, which is not repeated therein.

Figure 4A:
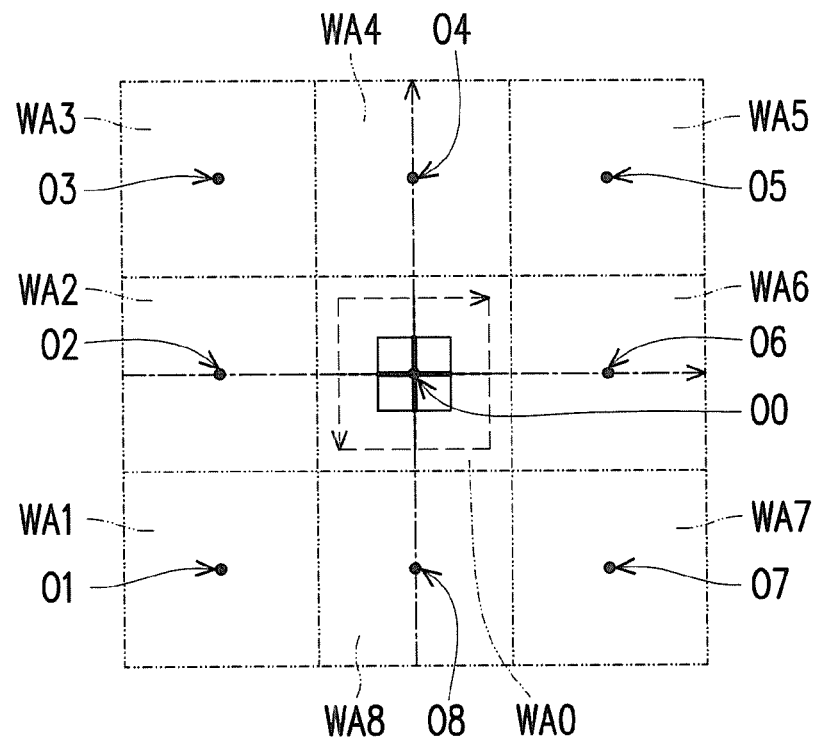
FIG. 4A is a schematic front view diagram illustrating the alignment mark depicted in FIG. 1 being located in an observation coordinate system of the working area.

FIG. 4A is a schematic front view diagram illustrating the alignment mark depicted in FIG. 1 being located in an observation coordinate system of the working area. Referring to FIG. 4A, in the embodiment, the working area WA further has a plurality of second preset positions O0, O1, O2, O3, O4, O5, O6, O7, O8. Specifically, in the embodiment, the working area WA may be divided into a plurality of working sub-areas WA0, WA1, WA2, WA3, WA4, WA5, WA6, WA7, WA8 arranged in array, and each of the second preset positions O0, O1, O2, O3, O4, O5, O6, O7, O8 may respectively be the center for each of the working sub-areas WA0, WA1, WA2, WA3, WA4, WA5, WA6, WA7, WA8, although the disclosure is not limited thereto. Those skilled persons in the art can set the positions for each of the second preset positions O0, O1, O2, O3, O4, O5, O6, O7, O8 according to an actual requirement, which is not repeated therein.

Figure 4B:
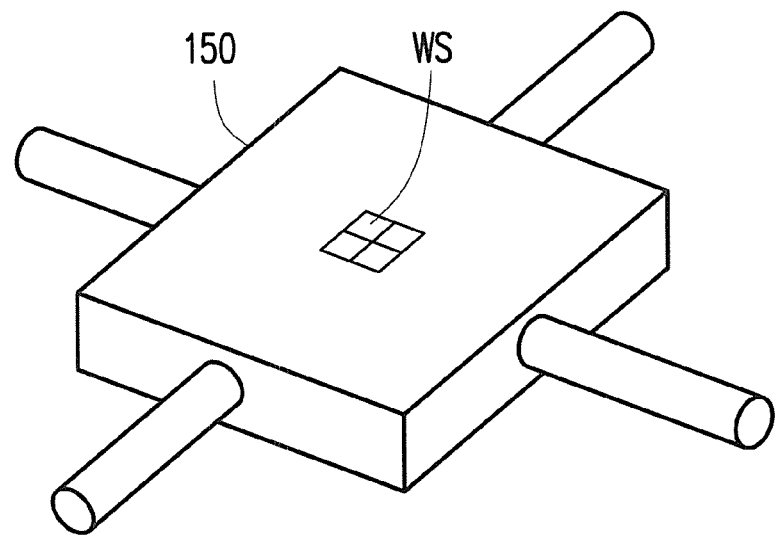
FIG. 4B is a schematic side view diagram illustrating a movable platform depicted in FIG. 2.
Figure 4C:
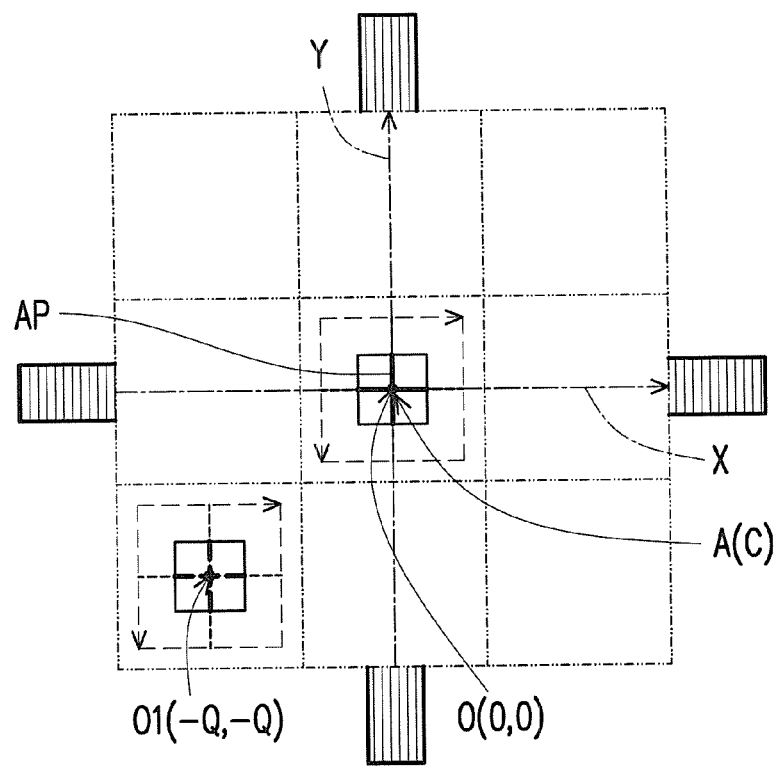
FIG. 4C is a schematic front view diagram illustrating the working area depicted in FIG. 1 being located on the movable platform.
Figure 4D:
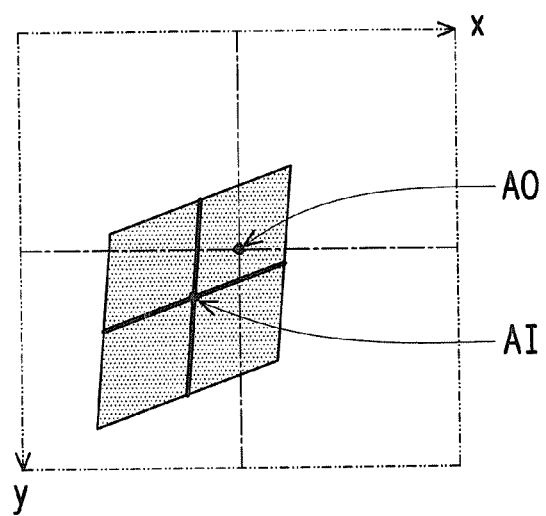
FIG. 4D and FIG. 4E are schematic front view diagrams illustrating the alignment mark image depicted in FIG. 4A being located at different observation coordinate systems of the visible area.

It should be noted that an alignment table belonging to the working area WA is produced in the embodiment by respectively and relatively moving the alignment point A of the alignment mark AP (as illustrated in FIG. 4C) and the alignment image point AI formed by the alignment point A (as illustrated in FIG. 4D) to a plurality of positions on the working area WA and the visible area AA in sequence and recording the related parameters. Therefore, the method for producing the alignment table belonging to the working area WA will be described in detail below with FIG. 4B through FIG. 5D, and the coordinate positions of the alignment point A and the alignment image point AI formed by thereof in each coordinate system will be raised to explicitly indicate the corresponding relationship between each point position on the working area WA and the visible area AA.

FIG. 4B is a schematic side view diagram illustrating a movable platform depicted in FIG. 2. FIG. 4C is a schematic front view diagram illustrating the working area depicted in FIG. 1 being located on the movable platform. Referring to FIG. 4B and FIG. 4C, step S130 is executed to locate the alignment point A of the alignment mark AP at one of the second preset positions such as O1(−Q,−Q). Specifically, step S130 in the embodiment may be executed by adjusting the movable platform 150 depicted in FIG. 4B although the disclosure is not limited thereto. To be specific, as shown in FIG. 4C, the alignment mark AP here is located on the movable platform 150 of the working area WA, and the alignment point A is also located at the first preset position O(0,0) on the coordinate system of the working area WA. Then, the movable platform 150 is capable of moving relative to the working area WA. In this way, the alignment point A may be located at one of the second preset positions O1(−Q,−Q) on the coordinate system of the working area WA.

Figure 4E:
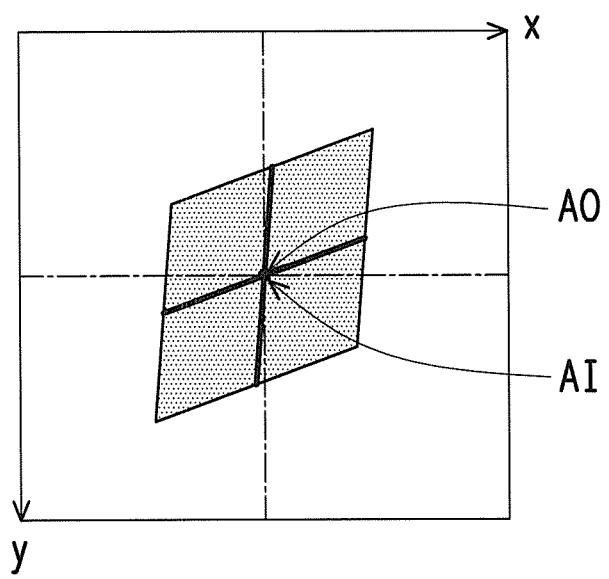

FIG. 4D and FIG. 4E are schematic front view diagrams illustrating the alignment mark image depicted in FIG. 4A being located at different observation coordinate systems of the visible area. Subsequently, step S140 is executed to adjust a plurality of parameters $(\theta_X, \theta_Y)$ of the scanning module 120 so that the alignment image point AI formed by the alignment point A on the visible area AA is located at the preset position AO of the visible area AA and these parameters $(\theta_X, \theta_Y)$ of the scanning module 120 are recorded. Specifically, the parameters $(\theta_X, \theta_Y)$ of the scanning module 120 in the embodiment may be the angular parameters or the positional parameters of the reflective mirrors 123, 125, for instance. More specifically, in theory, a corresponding relationship exists between the parameters $(\theta_X, \theta_Y)$ of the scanning module 120 and the coordinate positions (X, Y) in the working area WA, and the images on the different areas of the working area AA may be appeared within the visible area AA by adjusting the parameters $(\theta_X, \theta_Y)$ of the scanning module 120.

In general, since the wavelength ranges of the visible light 70 and the laser beam 60 travelling in the laser processing apparatus 100 are different, the optical axes of the visible light 70 and the laser beam 60 are caused to be different from each other after the visible light passing through the optical elements (such as the focus mirror 121), thereby generating visual error. In this way, there has been errors between the actual position of the alignment image point AI in the visible area AA formed by the alignment point A on the working area WA and the laser processed position.

For example, when the alignment point A is located at the second preset position O1(−Q,−Q) on the coordinate system of the working area WA and the parameters $(\theta_X, \theta_Y)$ of the scanning module 120 is adjusted to $(\theta_{-Q}, \theta_{-Q})$, the alignment image point AI formed by the alignment point A may theoretically be on the preset position AO. However, the alignment image point AI is actually deviated from the preset position AO, as shown in FIG. 4D. Therefore, the fine adjustment of the parameters $(\theta_X, \theta_Y)$ of the scanning module 120 is required once again, so that the alignment image point AI may be located at the preset position AO of the visible area AA. At this moment, the parameters $(\theta_X, \theta_Y)$ of the scanning module 120 may be presented as $(\theta_{-Q}+\Delta\theta_{X\ O1}, \theta_{-Q}+\Delta\theta_{Y\ O1})$ and the actual related values may be recorded simultaneously into the system for ease of subsequent reference.

To be more specific, since the afore-described visual error may also include image calculation error due to the image distortion, the calibration for the positions of the image point AI on the visible area AA, such as the positions P1(320+x1, 240−y1), P2(320−x1, 240−y1), P3(320−x1, 240+y1), P4(320+x1, 240+y1), may be performed once again so as to produce a more accurate alignment table. The descriptions below will be described in detail with FIG. 5A through FIG. 5D.

Figure 5A:
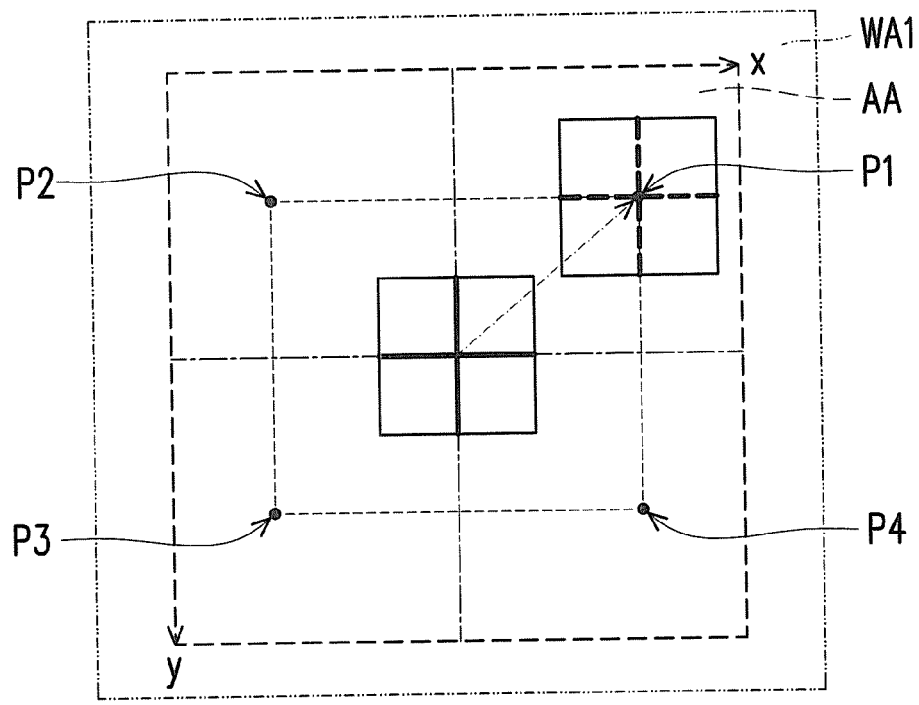
FIG. 5A is a schematic diagram illustrating a moving path of the alignment mark depicted in FIG. 1.
Figure 5B:
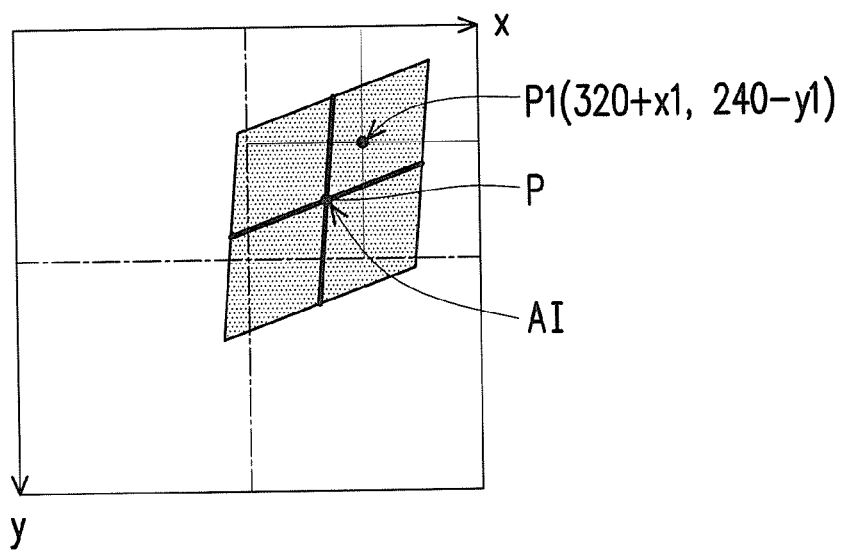
FIG. 5B is a schematic front view diagram illustrating the alignment mark depicted in FIG. 5A being located on the visible area.
Figure 5C:
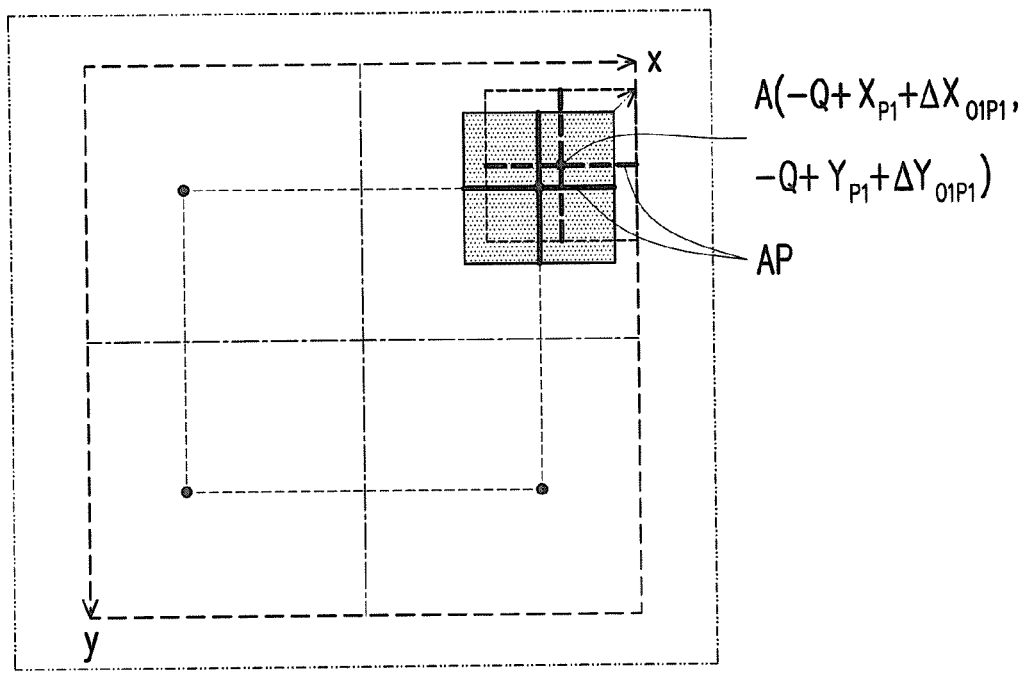
FIG. 5C is a schematic diagram illustrating a moving path of the alignment mark depicted in FIG. 5A.
Figure 5D:
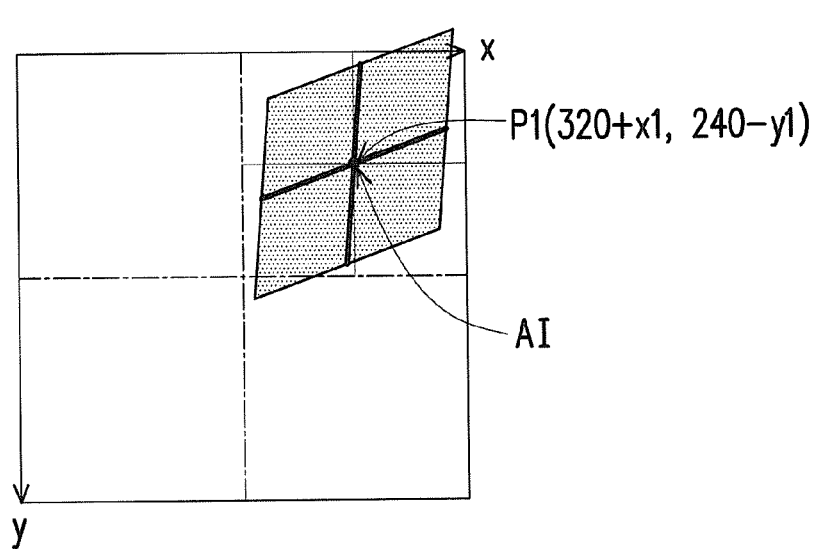
FIG. 5D is a schematic front view diagram illustrating the alignment mark depicted in FIG. 5C being located on the visible area.

FIG. 5A is a schematic diagram illustrating a moving path of the alignment mark depicted in FIG. 1. FIG. 5B is a schematic front view diagram illustrating the alignment mark depicted in FIG. 5A being located on the visible area. FIG. 5C is a schematic diagram illustrating a moving path of the alignment mark depicted in FIG. 5A. FIG. 5D is a schematic front view diagram illustrating the alignment mark depicted in FIG. 5C being located on the visible area. Referring to FIG. 5A through FIG. 5D, step S150 is executed to relatively move the alignment image point AI to the positions P1(320+x1, 240−y1), P2(320−x1, 240−y1), P3(320−x1, 240+y1), P4(320+x1, 240+y1) of the visible area AA in sequence, and to respectively record each coordinate position (x, y) of the alignment image point AI in the visible area AA, each coordinate position (X, Y) of the alignment point A in the working area WA and each parameter $(\theta_X, \theta_Y)$ of the scanning module 120, so as to produce the alignment table belonging to the working area WA.

Specifically, step S150 in the embodiment may be executed by adjusting the movable platform 150 depicted in FIG. 4B although the disclosure is not limited thereto. To be specific, as shown in FIG. 5A, if the alignment image point AI is to be relatively moved to the position P1(320+x1, 240−y1) of the visible area AA, the movable platform 150 may be moved to a point P relative to the working area WA according to a calculated theoretical value. At this moment, the coordinate position (X, Y) of the alignment point A in the working area WA may be presented as the coordinate position $(-Q+X_{P1}, -Q+Y_{P1})$. However, as shown in FIG.

5B, the alignment image point AI in the visible area AA here is slightly deviated from the position P1(320+x1, 240−y1). Therefore, the movable platform 150 is required to move slightly relative to the working area WA once again, so as to finely adjust the position of the alignment mark AP (as shown in FIG. 5C), so that the alignment image point AI may be located at the position P1(320+x1, 240−y1) of the visible area AA (as shown in FIG. 5D). At this moment, the coordinate position (X, Y) of the alignment point A in the working area WA may be presented as the coordinate position $(-Q+X_{P1}+\Delta X_{O1P1}, -Q+Y_{P1}+\Delta Y_{O1P1})$ and the actual related values may be recorded simultaneously into the system for ease of subsequent reference. Subsequently, the calibration on other positions P2(320−x1, 240−y1), P3(320−x1, 240+y1), P4(320+x1, 240+y1) may be continually performed and the actual related values may be recorded simultaneously into the system for ease of subsequent reference. It should be noted that the sequence of calibrating other positions P2, P3 and P4 is not limited in the disclosure. Those skilled persons in the art can arrange the sequence of calibrating these positions P2, P3 and P4 according to an actual requirement, which is not repeated therein. In addition, the method for executing the calibration of other positions P2, P3 and P4 is similar to the steps executed in FIG. 5A through FIG. 5D, which is not repeated therein.

Table 1 is an alignment table that records the coordinate variations of the alignment point depicted in FIG. 1.

TABLE 1 the alignment table of the working sub-area WA1

| X, Y | x, y | $\theta_X, \theta_Y$ |
|---|---|---|
| O1   −Q, −Q | 320, 240 | $\theta_{-Q} + \Delta\theta_{X\,O1}, \theta_{-Q} + \Delta\theta_{Y\,O1}$ |
| P1   $-Q + X_{P1} + \Delta X_{O1P1}$, $-Q + Y_{P1} + \Delta Y_{O1P1}$ | 320 + x1, 240 − y1 | $\theta_{-Q} + \Delta\theta_{X\,O1}, \theta_{-Q} + \Delta\theta_{Y\,O1}$ |
| P2   $-Q + X_{P2} + \Delta X_{O1P2}$, $-Q + Y_{P2} + \Delta Y_{O1P2}$ | 320 − x1, 240 − y1 | $\theta_{-Q} + \Delta\theta_{X\,O1}, \theta_{-Q} + \Delta\theta_{Y\,O1}$ |
| P3   $-Q + X_{P3} + \Delta X_{O1P3}$, $-Q + Y_{P3} + \Delta Y_{O1P3}$ | 320 − x1, 240 + y1 | $\theta_{-Q} + \Delta\theta_{X\,O1}, \theta_{-Q} + \Delta\theta_{Y\,O1}$ |
| P4   $-Q + X_{P4} + \Delta X_{O1P4}$, $-Q -+ Y_{P4} + \Delta Y_{O1P4}$ | 320 + x1, 240 + y1 | $\theta_{-Q} + \Delta\theta_{X\,O1}, \theta_{-Q} + \Delta\theta_{Y\,O1}$ |

As shown in Table 1, after completing steps S130, S140 and S150, each coordinate position (x, y) of the alignment image point AI in the visible area AA, each coordinate position (X, Y) of the alignment point A in the working area WA and each parameter $(\theta_X, \theta_Y)$ of the scanning module 120 may be collected to form the alignment table belonging the working sub-area WA1. Additionally, although the afore-described positions of the visible area AA are taken the four positions P1, P2, P3 and P4 arranged in array as an example, the quantity and the arrangement of these positions are not limited in the disclosure. In other words, the quantity of the positions may also be other numbers and the arrangement thereof may also be other suitable regular arrangements or irregular arrangements in other applicable embodiments, although the disclosure is not limited thereto.

Table 2 is another alignment table that records the coordinate variations of the alignment point depicted in FIG. 1.

TABLE 2 the alignment table of the working area WA

| X, Y | x, y | $\theta_X, \theta_Y$ |
|---|---|---|
| O    0, 0 | 320, 240 | 0, 0 |
| O1   −Q, −Q | 320, 240 | $\theta_{-Q} + \Delta\theta_{X\,O1}, \theta_{-Q} + \Delta\theta_{Y\,O1}$ |
| WA1  P1、P2、P3、P4 . . . Pn | | $\theta_{-Q} + \Delta\theta_{X\,O1}, \theta_{-Q} + \Delta\theta_{Y\,O1}$ |

TABLE 2-continued the alignment table of the working area WA

| X, Y | x, y | $\theta_X, \theta_Y$ |
|---|---|---|
| O2   −Q, 0 | 320, 240 | $\theta_{-Q} + \Delta\theta_{X\,O2}, \theta_0 + \Delta\theta_{Y\,O2}$ |
| WA2  P1、P2、P3、P4 . . . Pn | | $\theta_{-Q} + \Delta\theta_{X\,O2}, \theta_0 + \Delta\theta_{Y\,O2}$ |
| . . . | | |
| WAn  P1、P2、P3、P4 . . . Pn | | $\theta_{X\,On} + \Delta\theta_{X\,On}, \theta_{Y\,On} + \Delta\theta_{Y\,On}$ |

In the embodiment, steps S130, S140 and S150 may be further repeated several times, and the second preset positions O0, O1, O2, O3, O4, O5, O6, O7, O8 in step S130 being repeated several times are different from each other so as to respectively complete each alignment table belonging to each of the working sub-areas WA0, WA1, WA2, WA3, WA4, WA5, WA6, WA7, WA8. After calibrating the actual required range of the working area WA, each obtained coordinate position (x, y) of the alignment image point AI in the visible area AA, each obtained coordinate position (X, Y) of the alignment point A in the working area WA and the obtained parameters $(\theta_X, \theta_Y)$ of the scanning module 120 may be collected into the alignment table belonging the working area WA for ease of subsequent reference.

For example, the column including WA1, P1, P2, P3, P4 . . . Pn, and $\theta_{-Q}+\Delta\theta_{X\,O1}, \theta_{-Q}+\Delta\theta_{Y\,O1}$ in Table 2 means that such column may be served as the alignment table belonging to the working sub-area WA1. In other words, after the alignment table belonging to the working sub-area WA1 (namely, Table 1) is completed, such table may be collected into the column labelling WA1, P1, P2, P3, P4 . . . Pn, and $\theta_{-Q}+\Delta\theta_{X\,O1}, \theta_{-Q}+\Delta\theta_{Y\,O1}$ in the alignment table belonging to the working area WA (namely, Table 2), so as to complete the alignment table belonging to the working area WA (namely, Table 2). Additionally, the quantity of aligning positions in the working sub-area WA1 is not limited in the embodiment, such that P1, P2, P3, P4 . . . Pn are taken to present the plurality of aligning positions in the working sub-area WA1. In the embodiment, the method for completing the alignment table belonging to the working sub-area WA1 is similar to the method of producing Table 1, so that the detailed description may be referred to the descriptions above, which is not repeated therein.

Moreover, although taking the working area WA being divided into nine working sub-areas WA0, WA1, WA2, WA3, WA4, WA5, WA6, WA7 and WA8 as an example in the descriptions above, the quantity of working sub-area is not limited in the embodiment, such that WA1, WA2 . . . WAn are taken to present as the plurality of working sub-areas, in which the method for producing the alignment table belonging to each of the working sub-areas WA1, WA2 . . . WAn is similar to the method of producing Table 1, so that the detailed description may be referred to the descriptions above, which is not repeated therein. In other words, after the alignment tables belonging to the working sub-areas WA1, WA2 . . . WAn are completed, such tables may be collected into each of the columns labelling WA1-WA2 . . . WAn in the alignment table belonging to the working area WA (namely, Table 2), so as to complete the alignment table belonging to the working area WA (namely, Table 2).

Moreover, in the embodiment, the arrangement of each working sub-area is also not limited. In other words, the quantity of the working sub-areas may also be other numbers and the arrangement thereof may also be other suitable arrangements in the embodiment, although the disclosure is not limited thereto. Additionally, the sequence of executing the working sub-areas is not limited in the disclosure, and the calibration to be performed on each of the working sub-areas is also not limited in the disclosure. Those skilled persons in the art can determine whether to perform a calibration on each of the working sub-areas and can arrange the related execution sequence of the working sub-areas according to an actual required range of the working area WA, which is not repeated therein.

For example, in other embodiments, if the actual required range for the user to operate on is four working sub-areas, then the user may perform the calibration on the required areas. To be specific, the user may repeatedly execute steps S130, S140 and S150 several times on the four working sub-areas such as WA0, WA8, WA1 and WA2, to produce an alignment table including the required four working sub-areas WA0, WA8, WA1, WA2 and to satisfy the required working range when a workpiece is actually processed by the laser processing apparatus 100.

In addition, the embodiment is also capable of calibrating the four working sub-areas WA1, WA3, WA5, WA7 located at the four corners of the working area WA and accordingly producing an alignment table and obtaining corresponding values of other working sub-areas according to the recorded data of the alignment table and the calculation using interpolation. Thus, the alignment table belonging to the working area WA may also be completed.

Further, when the workpiece is processed by the laser processing apparatus 100 in practice, the user may control the laser beam 60 to a position of the workpiece to be processed through the workpiece image observed from the visible area AA and simultaneously refer to Table 1, Table 2 or the data recorded in the afore-described alignment tables belonging to the working areas of other ranges. After obtaining an actual position corresponding to the expected position on the working area WA through the interpolation, the related parameters or positions of the laser processing apparatus 100 may further be set to process the workpiece. By this way, the laser processing apparatus may achieve the effect of "what being seen is what being processed" and effectively reduce the visual positioning error and the image calculation error.

Figure 6:
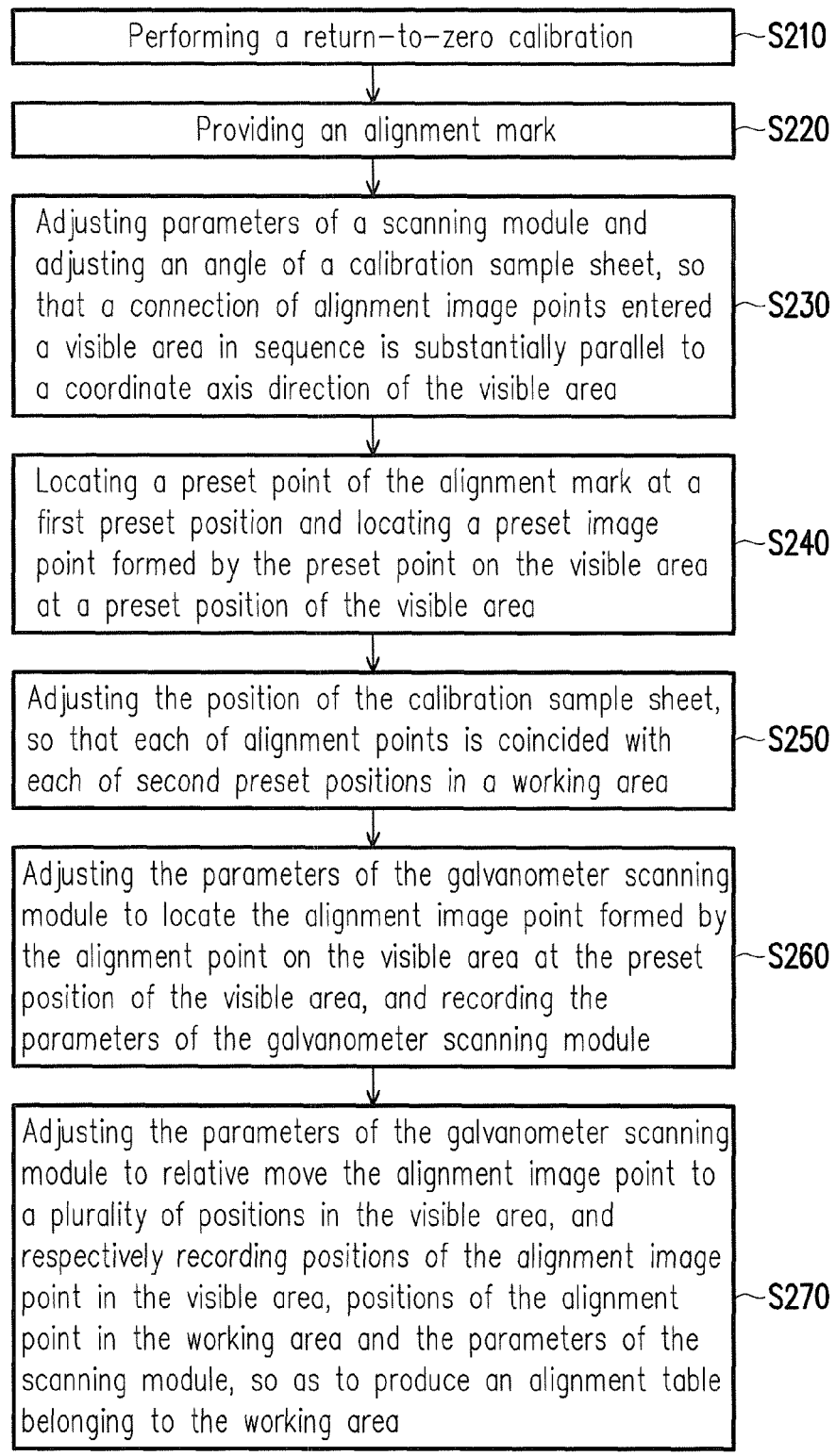
FIG. 6 is a flowchart diagram illustrating a visual error calibration method according to another exemplary embodiment.
Figure 7:
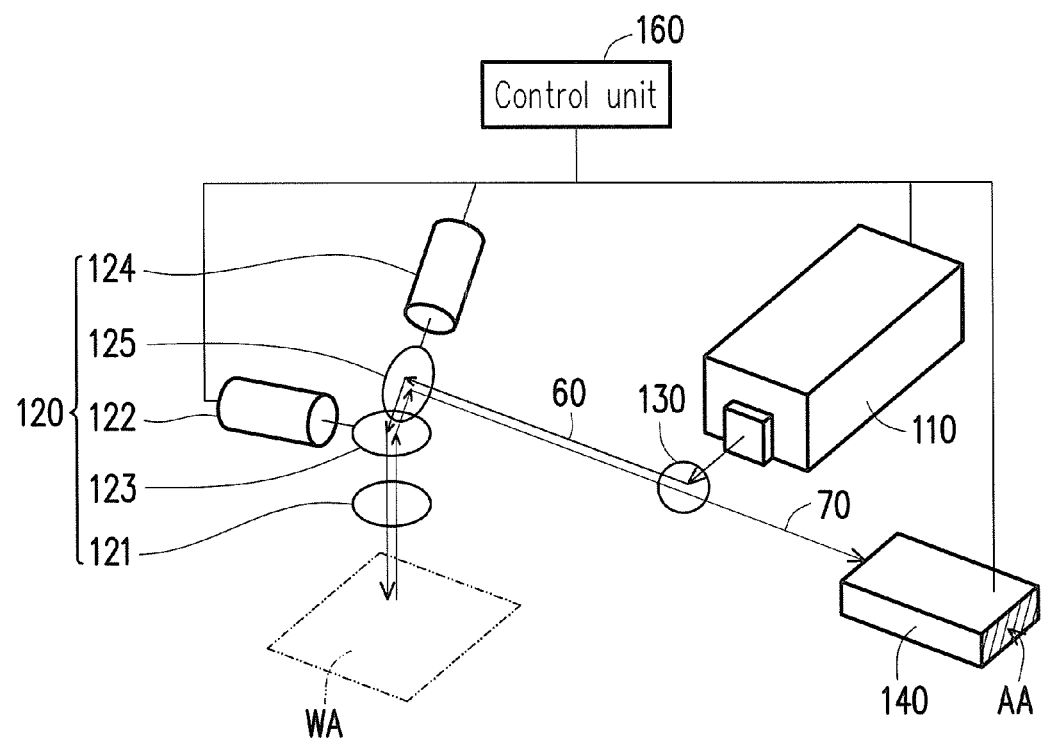
FIG. 7 is a structural schematic diagram illustrating a laser processing apparatus according to another exemplary embodiment.

FIG. 6 is a flowchart diagram illustrating a visual error calibration method according to another exemplary embodiment. FIG. 7 is a structural schematic diagram illustrating a laser processing apparatus according to another exemplary embodiment. In the embodiment, the visual error calibration method may employ the laser processing apparatus 100 depicted in FIG. 2 or the laser processing apparatus 200 depicted in FIG. 7 to implement, although the disclosure is not limited thereto. Alternatively, the visual error calibration method may also be implemented through a computer program product (that includes program instructions for executing the visual error calibration method) loaded into the laser processing apparatus 100 depicted in FIG. 2 or the laser processing apparatus 200 depicted in FIG. 7 and relative hardware thereof, although the disclosure is not limited thereto. The visual error calibration method in the embodiment is similar to the visual error calibration method depicted in FIG. 1, where the difference between the two embodiments will be described as follow.

Referring to FIG. 6, step S210 is firstly executed to perform a return-to-zero calibration. After forming a return-to-zero alignment mark TP on a laser processing sample sheet WS by laser processing, a calibration point T of the return-to-zero alignment mark TP is located at the first preset position O of the working area WA, and a calibration image point TI formed by the calibration point T on the visible area AA is located at the preset position AO of the visible area AA (namely, the center of the visible area AA). In the embodiment, the calibration point T is the center of the return-to-zero alignment mark TP, although the disclosure is not limited thereto. Those skilled persons in the art can plan the calibration point T according to an actual requirement, which is not repeated therein. Additionally, in the embodiment, the methods for forming the return-to-zero alignment mark TP and moving the calibration point T and the calibration image point TI are similar to the methods for forming the alignment mark AP and moving the preset point C and the preset image point CI depicted in FIG. 3A through FIG. 3E, so that the detailed description may be referred to the descriptions above, which is not repeated therein.

Figure 8:
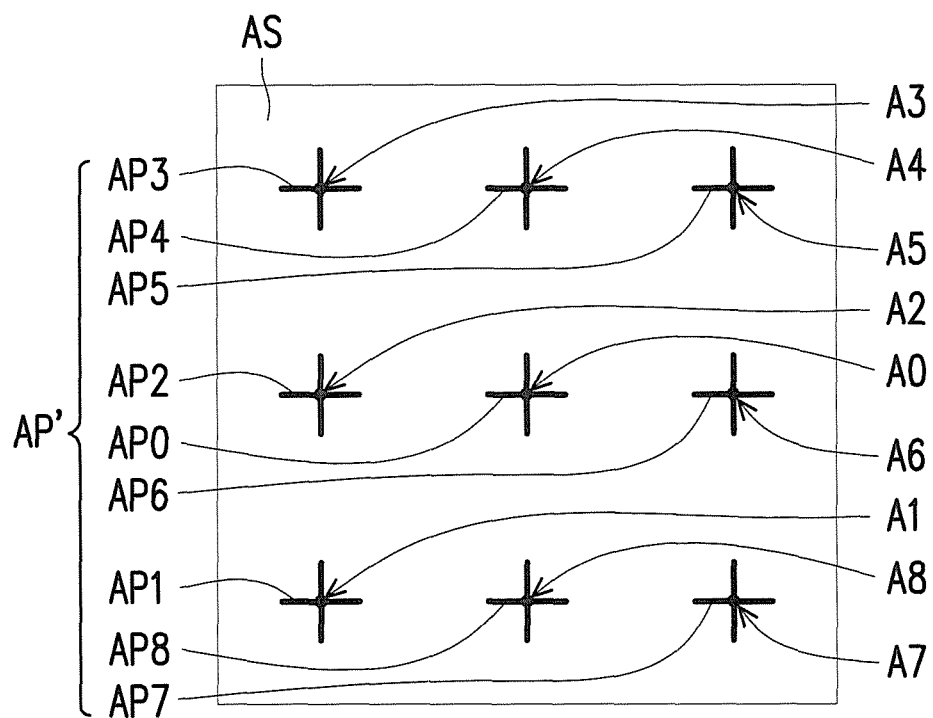
FIG. 8 is a schematic front view diagram illustrating an alignment mark depicted in FIG. 6.

FIG. 8 is a schematic front view diagram illustrating an alignment mark depicted in FIG. 6. Subsequently, referring to FIG. 8, step S220 is executed to provide a calibration sample sheet AS. In the embodiment, the calibration sample sheet AS may be fabricated by optical glass, for instance. In addition, the calibration sample sheet AS has an accurate alignment mark AP', and the alignment mark AP' has a plurality of alignment points A0, A1, A2, A3, A4, A5, A6, A7 and A8. Specifically, in the embodiment, each of the alignment points A0, A1, A2, A3, A4, A5, A6, A7, A8 is respectively located on a plurality of alignment sub-marks AP0, AP1, AP2, AP3, AP4, AP5, AP6, AP7, AP8 of the alignment mark AP'. The alignment sub-marks AP0, AP1, AP2, AP3, AP4, AP5, AP6, AP7 and AP8, are symmetrically distributed on a calibration sample sheet AS. In the embodiment, each of the alignment points A0, A1, A2, A3, A4, A5, A6, A7, A8 is respectively the center for each of the alignment sub-marks AP0, AP1, AP2, AP3, AP4, AP5, AP6, AP7 and AP8, although the disclosure is not limited thereto. Those skilled persons in the art can plan each of the alignment points A0, A1, A2, A3, A4, A5, A6, A7, A8 according to an actual requirement, which is not repeated therein. Additionally, the shape of the alignment sub-marks AP0, AP1, AP2, AP3, AP4, AP5, AP6, AP7, AP8 in the embodiment is a crisscross shape, although the disclosure is not limited thereto. In other embodiments, each of the alignment sub-marks AP0, AP1, AP2, AP3, AP4, AP5, AP6, AP7, AP8 may also be a circular shape, a polygonal shape or any other easy-identified shapes where the shapes may also be identical or different from each other, although the disclosure is not limited thereto.

On the other hand, due to the alignment mark AP' and the return-to-zero alignment mark TP are not the same in the embodiment, and due to the alignment mark AP' includes the plurality of alignment sub-marks AP0, AP1, AP2, AP3, AP4, AP5, AP6, AP7, AP8, the calibration sample sheet AS is further required to be adjusted in direction so as to prevent the offset occurred in the moving direction when the different images on different areas of the alignment mark AP' are moved within the visible area AA. Such adjustment will be described in detail below with FIG. 9A through FIG. 9E.

Figure 9A:
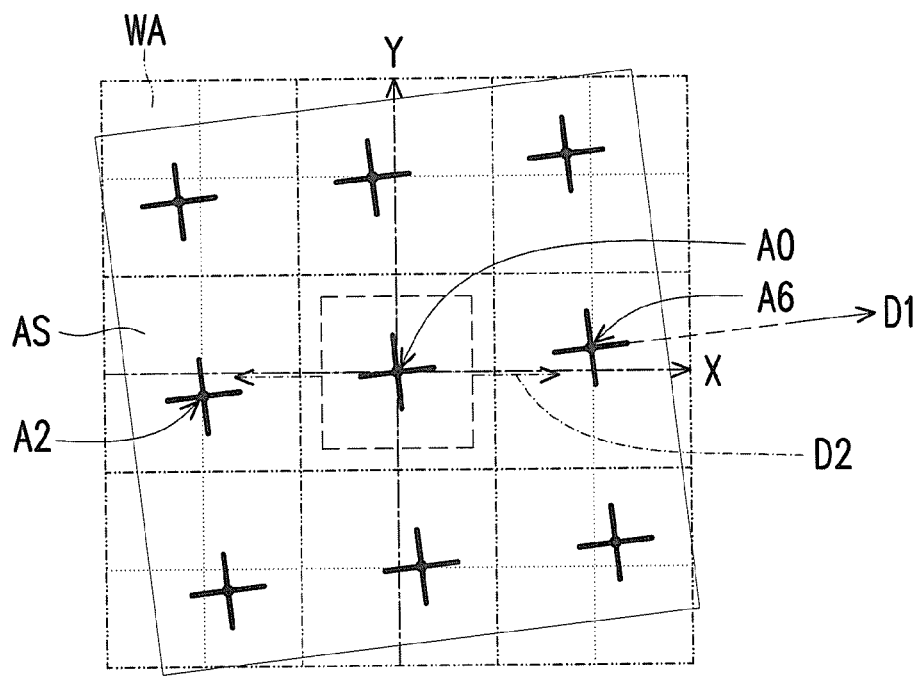
FIG. 9A through FIG. 9E are schematic diagrams illustrating a process of the method for calibrating a position of the alignment mark depicted in FIG. 6.
Figure 9B:
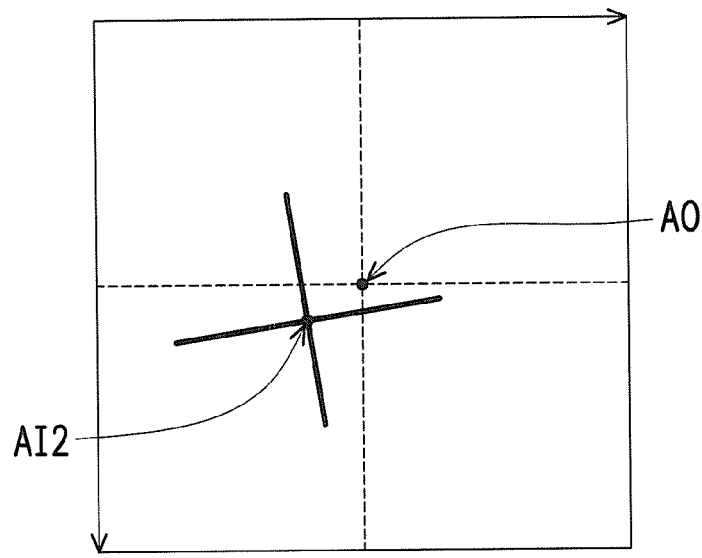
Figure 9C:
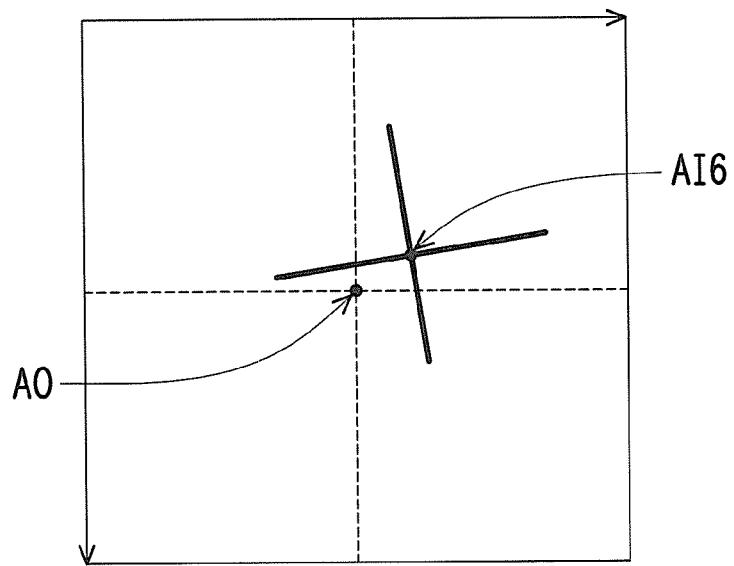

FIG. 9A through FIG. 9E are schematic diagrams illustrating a process of the method for calibrating a position of the alignment mark depicted in FIG. 6. Referring to FIG. 9A, the parameters ($\theta_X$, $\theta_Y$) of the scanning module 120 are adjusted, so that the alignment points A0, A2, A6 of the alignment sub-marks AP0, AP2, AP6 located along a fixed direction of the calibration sample sheet AS such as the direction D1 may respectively form each of the alignment image points AI0, AI2 and AI6 in sequence within the visible area AA. In the embodiment, the x-axis of the coordinate system of the working area WA and the x-axis of the coordinate system of the visible area AA are both in the horizontal direction, for instance. However, as shown in FIG. 9B and FIG. 9C, the alignment image points AI2 and AI6 here are respectively appeared to be above and below the preset position AO in the visible area AA, and cannot be parallel to a relative moving direction D2 for the coordinate system of the working area WA and the coordinate system of the visible area AA. In the embodiment, the direction D2 is parallel to the x-axis of the coordinate system of the visible area AA (namely, in the horizontal direction), for instance. In other words, the direction that the calibration sample sheet AS being placed is not parallel to the direction of the coordinate system of the working area WA, at this moment.

Figure 9D:
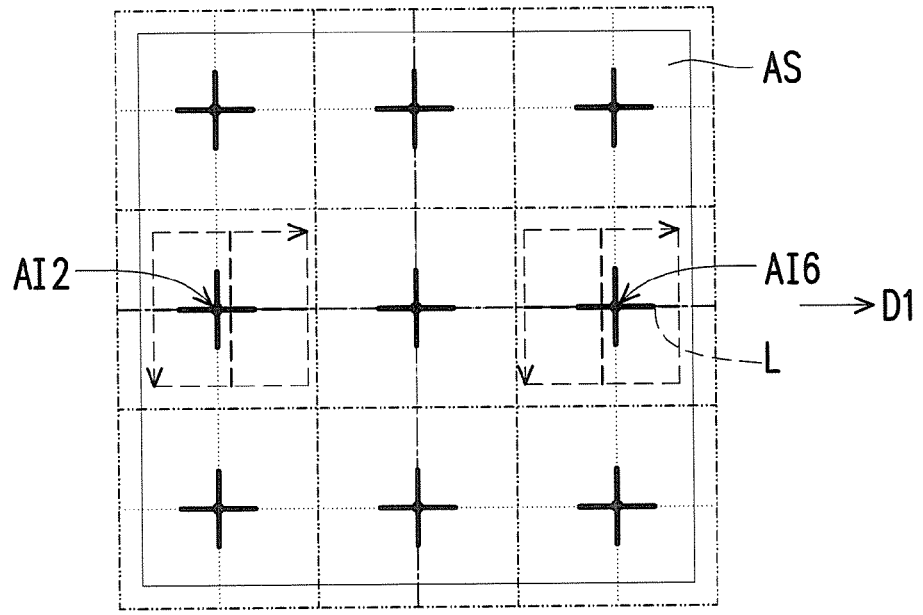

Accordingly, referring to FIG. 9D, step S230 is executed to adjust the horizontal angle of the calibration sample sheet AS being placed and to adjust the angular parameter of the scanning module, so that a connection of the alignment image points AI2 and AI6 entered the visible area AA in sequence is substantially parallel to a coordinate axis direction of the visible area AA along the x-direction (namely, the horizontal direction), so as to complete the directional adjustment of the calibration sample sheet AS. In the embodiment, the connection of the alignment image points AI2 and AI6 entered the visible area AA in sequence may be substantially coincided with a horizontal reference axis L of the visible area AA, in which the horizontal reference axis L may be a horizontal line passing through the preset position AO in the visible area AA, for instance.

Figure 9E:
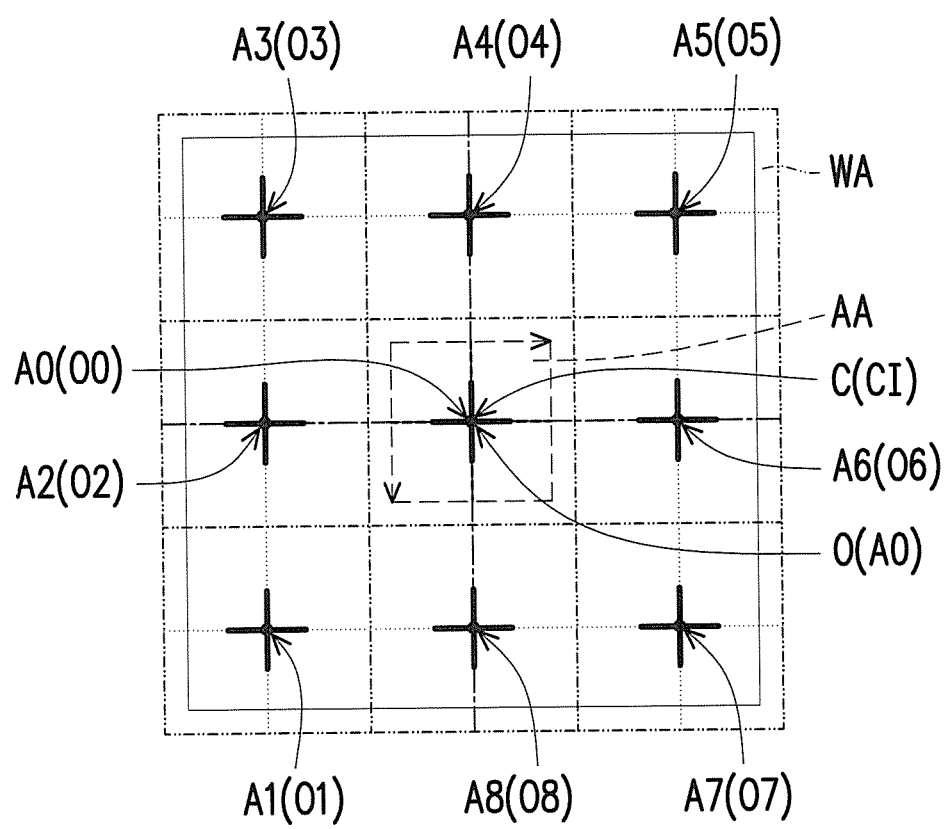

Subsequently, as shown in FIG. 9E, step S240 and step S250 are executed to locate the preset point C of the alignment mark AP' at the first preset position O of the working area WA, to locate the preset image point CI formed by the preset point C on the visible area AA at the preset position AO of the visible area AA and to adjust the position of the calibration sample sheet AS, so that at least one of the alignment points such as the alignment point A0, A1, A2, A3, A4, A5, A6, A7 or A8 is coincided with at least one of the second preset positions O0, O1, O2, O3, O4, O5, O6, O7 or O8 in the working area WA. In the embodiment, each of the alignment points A0, A1, A2, A3, A4, A5, A6, A7, A8 is respectively coincided with each of the second preset positions O0, O1, O2, O3, O4, O5, O6, O7 and O8 in the working area WA, although the disclosure is not limited thereto.

Figure 10A:
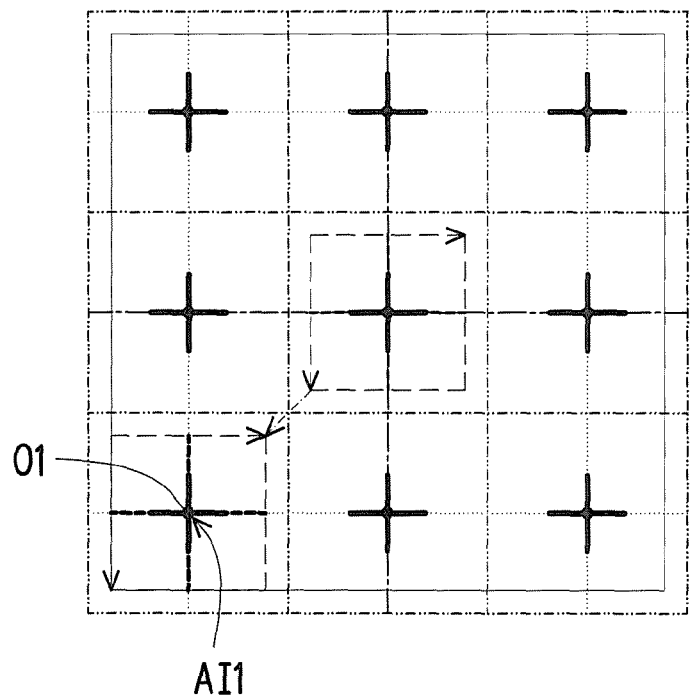
FIG. 10A is a schematic diagram illustrating a relative moving path between observation coordinate systems of the working area and the visible area depicted in FIG. 6.
Figure 10B:
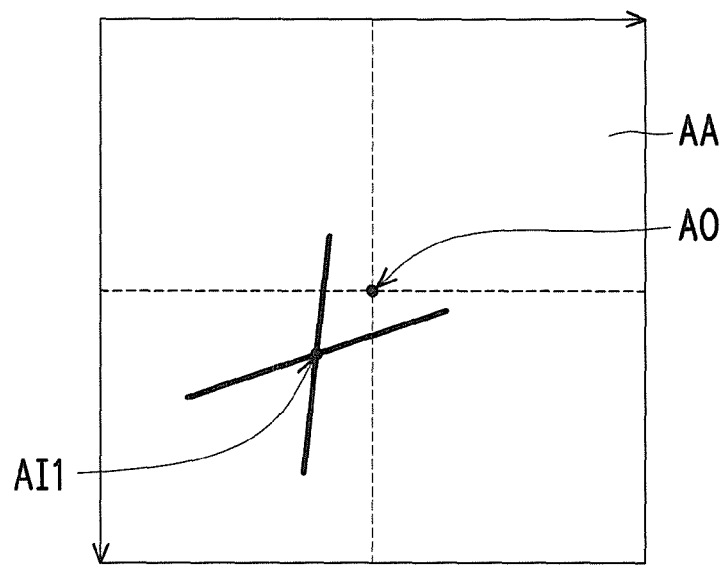
FIG. 10B and FIG. 10C are schematic front view diagrams illustrating an alignment sub-mark depicted in FIG. 10A being on different observation coordinate systems of the visible area.
Figure 10C:
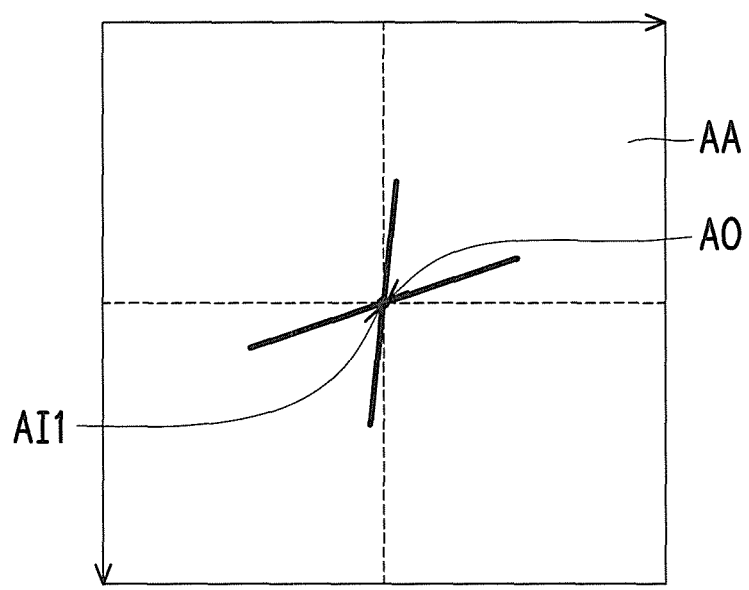

FIG. 10A is a schematic diagram illustrating a relative moving path between observation coordinate systems of the working area and the visible area depicted in FIG. 6. FIG. 10B and FIG. 10C are schematic front view diagrams illustrating an alignment sub-mark depicted in FIG. 10A being on different observation coordinate systems of the visible area. Then, referring to FIG. 10A through FIG. 10C, step S260 is executed to adjust the plurality of parameters ($\theta_X$, $\theta_Y$) of the scanning module 120, so that the alignment image point AI1 formed by the at least one alignment point A1 (that is located at one of the second preset position O1) on the visible area AA is located at the preset position AO of the visible area AA (as shown in FIG. 10C), and these parameters ($\theta_X$, $\theta_Y$) of the scanning module 120 are recorded. In the embodiment, the method of executing step S260 is similar to the method of executing step S140, so that the related details are illustrated in the descriptions above, which is not repeated therein.

Figure 11A:
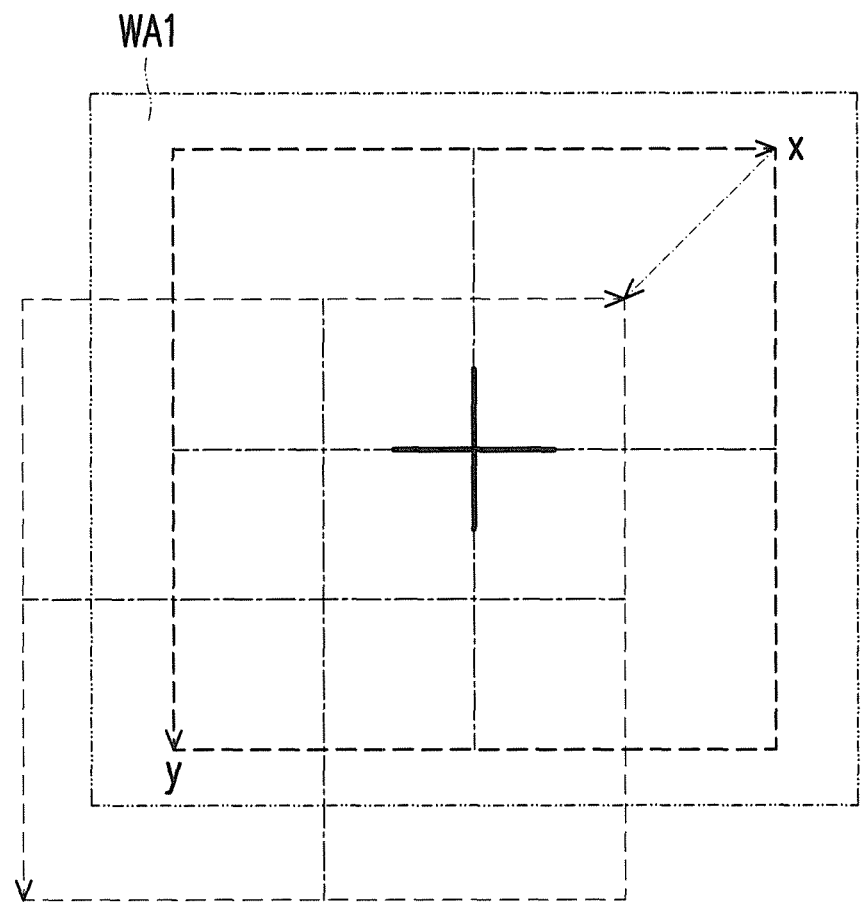
FIG. 11A is a schematic diagram illustrating a relative moving path between observation coordinate systems of the working area and the visible area depicted in FIG. 6.
Figure 11B:
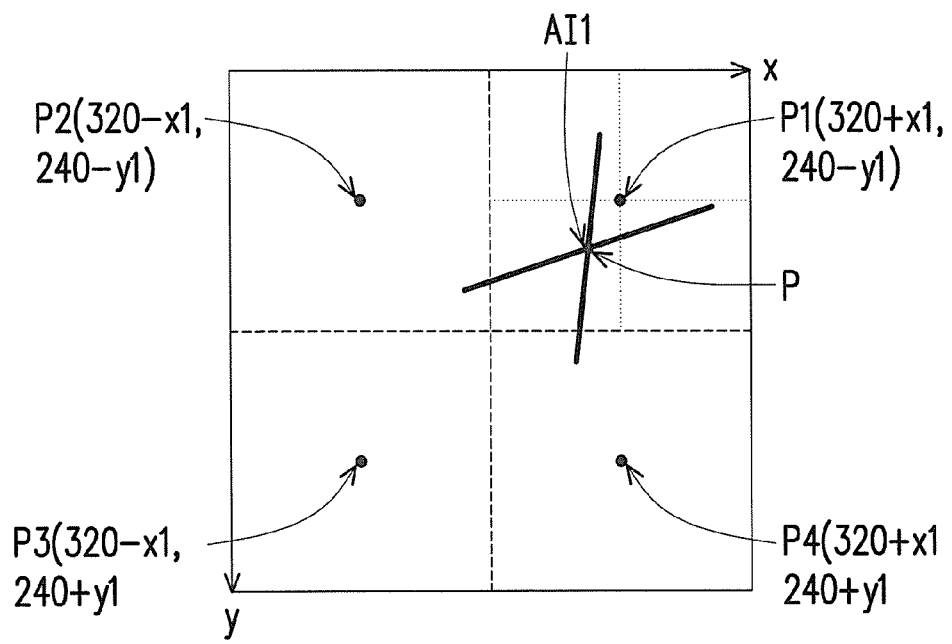
FIG. 11B and FIG. 11C are schematic front view diagrams illustrating an alignment sub-mark depicted in FIG. 11A being on different observation coordinate systems of the visible area.
Figure 11C:
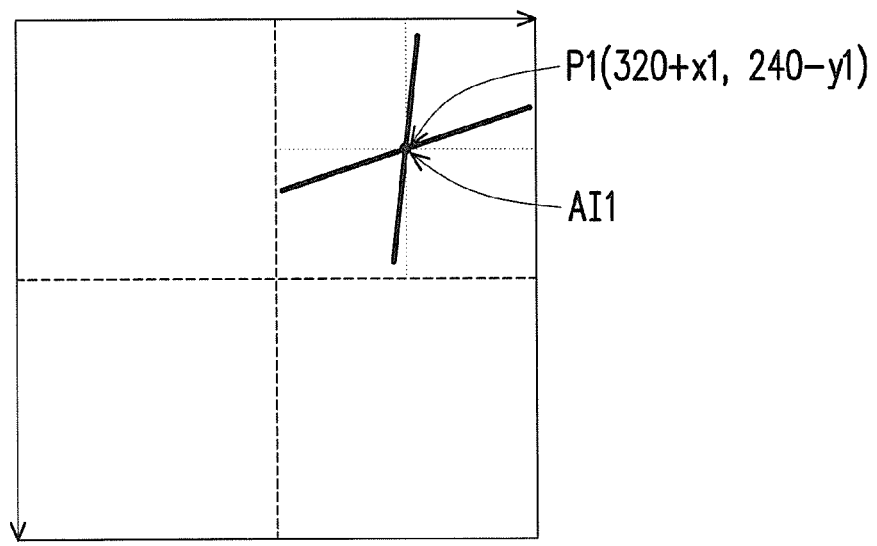

FIG. 11A is a schematic, diagram illustrating a relative moving path between observation coordinate systems of the working area and the visible area depicted in FIG. 6. FIG. 11B and FIG. 11C are schematic front view diagrams illustrating an alignment sub-mark depicted in FIG. 11A being on different observation coordinate systems of the visible area. Then, referring to FIG. 11A through FIG. 11C, step S270 is executed to relatively move the alignment image point AI1 to a plurality of positions P1(320+x1, 240−y1), P2(320−x1, 240−y1), P3(320−x1, 240+y1), P4(320+x1, 240+y1) on the visible area in sequence, and to respectively record each coordinate position (x, y) of the alignment image point AI1 in the visible area AA, each coordinate position (X, Y) of the alignment point A1 in the working area WA and the parameter ($\theta_X$, $\theta_Y$) of the scanning module 120, so as to produce the alignment table belonging to the working sub-area WA1.

Specifically, in the embodiment, step S270 is similar to step S150 where the difference between the two steps will be described as follow. In the embodiment, the method of relatively moving the alignment image point AI1 in sequence may be executed by adjusting the parameter ($\theta_X$, $\theta_Y$) of the scanning module 120, for instance. To be more specific, referring to FIG. 11A and FIG. 11B, if taking the alignment image point AI to be relatively moved to the position P1(320+x1, 240−y1) of the visible area AA as an example, the parameter ($\theta_X$, $\theta_Y$) of the scanning module 120 may be adjusted according to a calculated theoretical value so as to move the alignment image point AI1 to a point P in the visible area AA. At this moment, the parameter ($\theta_X$, $\theta_Y$) of the scanning module 120 may be presented as ($\theta_{-Q}+\Delta\theta_{O1X}+\theta_{XP1}$, $\theta_{-Q}+\Delta\theta_{O1Y}+\theta_{YP2}$). However, as shown in FIG. 11B, the alignment image point AI in the visible area AA here is also slightly deviated from the position P1(320+x1, 240−y1). Therefore, the parameter ($\theta_X$, $\theta_Y$) of the scanning module 120 is required to adjust slightly once again, so that the alignment image point AI may be located at the position P1(320+x1, 240−y1) of the visible area AA (as shown in FIG. 11C). At this moment, the parameter ($\theta_X$, $\theta_Y$) of the scanning module 120 may be presented as ($\theta_{-Q}+\Delta\theta_{X\ O1}+\theta_{X\ P1}+\Delta\theta_{X\ O1P1}$, $\theta_{-Q}+\Delta\theta_{Y\ O1}+\theta_{Y\ P1}+\Delta\theta_{X\ O1P1}$), and the actual related values may be recorded simultaneously into the system for ease of subsequent reference. Subsequently, the calibration on other positions P2(320−x1, 240−y1), P3(320−x1, 240+y1), P4(320+x1, 240+y1) may be continually performed and the actual related values may be recorded simultaneously into the system for ease of subsequent reference. The detailed descriptions of such part are similar to the afore-described steps depicted in FIG. 11A through FIG. 11C, and other related descriptions are also illustrated in the steps depicted in FIG. 5A through FIG. 5D, so that the detailed description may be referred to the descriptions above, which is not repeated therein.

Table 3 is an alignment table that records the coordinate variations of the alignment point and the alignment image points depicted in FIG. 6.

TABLE 3 the alignment table of the working sub-area WA1

| | X, Y | x, y | $\theta_X$, $\theta_Y$ |
|---|---|---|---|
| O1 | −Q, −Q | 320, 240 | $\theta_{-Q} + \Delta\theta_{X\ O1}$, $\theta_{-Q} + \Delta\theta_{Y\ O1}$ |
| P1 | −Q, −Q | 320 + x1, 240 − y1 | $\theta_{-Q} + \Delta\theta_{X\ O1} + \theta_{X\ P1} + \Delta\theta_{X\ O1P1}$, $\theta_{-Q} + \Delta\theta_{Y\ O1} + \theta_{Y\ P1} + \Delta\theta_{X\ O1P1}$ |
| P2 | | 320 − x1, 240 − y1 | $\theta_{-Q} + \Delta\theta_{X\ O1} + \theta_{X\ P2} + \Delta\theta_{X\ O1P2}$, $\theta_{-Q} + \Delta\theta_{Y\ O1} + \theta_{Y\ P2} + \Delta\theta_{X\ O1P2}$ |
| P3 | | 320 − x1, 240 + y1 | $\theta_{-Q} + \Delta\theta_{X\ O1} + \theta_{X\ P3} + \Delta\theta_{X\ O1P3}$, $\theta_{-Q} + \Delta\theta_{Y\ O1} + \theta_{Y\ P3} + \Delta\theta_{X\ O1P3}$ |
| P4 | | 320 + x1, 240 + y1 | $\theta_{-Q} + \Delta\theta_{X\ O1} + \theta_{X\ P4} + \Delta\theta_{X\ O1P4}$, $\theta_{-Q} + \Delta\theta_{Y\ O1} + \theta_{Y\ P4} + \Delta\theta_{X\ O1P4}$ |

As shown in Table 3, after completing steps S250, S260 and S270, each coordinate position (x, y) of the alignment image point AI1 in the visible area AA, each coordinate position (X, Y) of the alignment point A1 in the working area WA and each parameter ($\theta_X$, $\theta_Y$) of the scanning module 120 may be collected to form the alignment table belonging the working sub-area WA1. In the embodiment, the method of executing the collected Table 3 is similar to the method of executing the collected Table 1, so that the related details are illustrated in the descriptions above, which are not repeated therein.

Table 4 is another alignment table that records the coordinate variations of the alignment point and the alignment image points depicted in FIG. 6.

TABLE 4 the alignment table of the working area WA

| | X, Y | x, y | $\theta_X$, $\theta_Y$ |
|---|---|---|---|
| O | 0, 0 | 320, 240 | 0, 0 |
| O1 | −Q, −Q | 320, 240 | $\theta_{-Q} + \Delta\theta_{X\,O1}$, $\theta_{-Q} + \Delta\theta_{Y\,O1}$ |
| WA1 | −Q, −Q | | P1、P2、P3、P4 . . . Pn |
| O2 | −Q, 0 | 320, 240 | $\theta_{-Q} + \Delta\theta_{X\,O2}$, $\theta_0 + \Delta\theta_{Y\,O2}$ |
| WA2 | −Q, 0 | | P1、P2、P3、P4 . . . Pn |
| . . . | | | |
| On | $X_{On}$, $Y_{On}$ | 320, 240 | $\theta_{X\,On} + \Delta\theta_{X\,On}$, $\theta_{Y\,On} + \Delta\theta_{Y\,On}$ |
| WAn | $X_{On}$, $Y_{On}$ | | P1、P2、P3、P4 . . . Pn |

As shown in Table 4, step S260 and step S270 may be executed repeatedly several times, and the second preset positions O0, O1, O2, O3, O4, O5, O6, O7, O8 in the steps being repeated several times are different from each other so as to respectively complete each alignment table belonging to each of the working sub-areas WA0, WA1, WA2, WA3, WA4, WA5, WA6, WA7 and WA8, in the embodiment. After calibrating the actual required range of the working area WA, each obtained coordinate position (X, Y) of each alignment point A0, A1, A2, A3, A4, A5, A6, A7 or A8 in the working area WA, each obtained coordinate position (x, y) of each corresponding alignment image point AI in the visible area AA, and the obtained parameters ($\theta_X$, $\theta_Y$) of the scanning module 120 may be collected into the alignment table belonging the working area WA (as shown in Table 4) for ease of subsequent reference.

For example, the column including WA1, P1, P2, P3, P4 . . . Pn in Table 4 means that such column may be served as the alignment table belonging to the working sub-area WA1. In other words, after the alignment table belonging to the working sub-area WA1 (namely, Table 3) is completed, such table may be collected into the column labelling WA1, P1, P2, P3, P4 . . . Pn in the alignment table belonging to the working area WA (namely, Table 4), so as to complete the alignment table belonging to the working area WA (namely, Table 4). Additionally, the quantity of aligning positions in the working sub-area WA1 is not limited in the embodiment, such that P1, P2, P3, P4 . . . Pn are taken to present the plurality of aligning positions in the working sub-area WA1. In the embodiment, the method for completing the alignment table belonging to the working sub-area WA1 is similar to the method of producing Table 3, so that the detailed description may be referred to the descriptions above, which is not repeated therein.

Moreover, the quantity of working sub-area is also not limited in the embodiment, such that WA1, WA2 . . . WAn are taken to present as the plurality of working sub-areas, in which the method for producing the alignment table belonging to each of the working sub-areas wa1, WA2 . . . WAn is similar to the method of producing Table 3, so that the detailed description may be referred to the descriptions above, which is not repeated therein. In other words, after the alignment tables belonging to the working sub-areas WA1, WA2 . . . WAn are completed, such tables may be collected into each of the columns labelling WA1, WA2 . . . WAn in the alignment table belonging to the working area WA (namely, Table 4), so as to complete the alignment table belonging to the working area WA (namely, Table 4) in the embodiment.

In the embodiment, the method of executing the collected Table 4 is similar to the method of executing the collected Table 2, so that the related details are illustrated in the descriptions above, which are not repeated therein. The user can also determine whether to perform a calibration on each of the working sub-areas and can arrange the related execution sequence of the working sub-areas according to an actual required range of the working area WA, in which the method of executing the calibration within the actual required range in this part of the embodiment is similar to the method of executing the calibration within the actual required range depicted in FIG. 1, so that the detailed description may be referred to the descriptions above, which is not repeated therein.

Similarly, although the difference between the alignment table depicted in FIG. 1 and the alignment table depicted in FIG. 6 is the recorded values, the corresponding relationship among each coordinate position (x, y) of the alignment image points in the visible area AA, each coordinate position (X, Y) of the alignment points in the working area WA and each parameter ($\theta_X$, $\theta_Y$) of the scanning module 120 in the alignment tables will not be affected. Therefore, when the workpiece is processed by the laser processing apparatus 100 or the laser processing apparatus 200 in practice, the alignment tables depicted in FIG. 6 (namely, Table 3 and Table 4) may also be referenced, and the corresponding values between the actual processed position in the working area WA and the expected processed position in the visible area AA may be obtained by the interpolation so as to process the workpiece. The visual error calibration method depicted in FIG. 6 is similar to the visual error calibration method depicted in FIG. 1, which is not repeated therein.

Referring to FIG. 7 again, the laser processing apparatus 200 in the embodiment may be configured to automatically calibrate a plurality of visual positioning errors and execute the visual error calibration depicted in FIG. 6, although the disclosure is not limited thereto. The laser processing apparatus 200 includes a laser light source 110, a scanning module 120, a beam splitter 130, an image sensing unit 140 and a control unit 160. The laser light source 110 is adapted to emit a laser beam 60. The scanning module 120 has a focus mirror 121 and two reflective mirrors 123, 125. Specifically, the scanning module 120 is located on a transmission path of the laser beam 60, and the laser beam 60 is focused onto the working area WA after being reflected and deflected by the two reflective mirrors 123, 125 of the scanning module 120. On the other hand, the beam splitter 130 is also located on the transmission path of the laser beam 60, in which at least a portion of the wavelength range of the visible light 70 may be transmitted to the visible area AA of the image sensing unit 140 through the beam splitter 130. By this way, the center of the image being seen in the image sensing unit 140 is the laser focus since the observation optical axis and the laser optical axis are coaxial.

The control unit 160 is electrically connected to the scanning module 120 and the image sensing unit 140. The control unit 160 is capable of adjusting the parameters ($\theta_X$, $\theta_Y$) of the scanning module 120, in which the parameters ($\theta_X$, $\theta_Y$) of the scanning module 120 may be the angular parameter or the positional parameters of the reflective mirrors 123 and 125. To be specific, the control unit 160 of the laser processing apparatus 200 may be configured to execute the steps S210, S220, S230, S240, S250, S260, S270 depicted in FIG. 6. The control unit 160 may be configured to respectively and relatively move the alignment mark AP and the alignment mark image PI formed thereof in the visible area AA to the plurality of positions on the working area WA and the visible area AA in sequence. After determining whether the alignment mark AP and the alignment mark image PI are corresponded, the control unit 160 records each coordinate position (x, y) of the alignment mark image PI in the visible area AA, each coordinate position (X, Y) of the alignment mark AP in the working area WA and each parameter ($\theta_X$, $\theta_Y$) of the scanning module 120 so as to produce an alignment table belonging to the working area WA (e.g., as shown in FIG. 6, FIG. 11B and FIG. 11C) for ease of subsequent reference and accordingly automatically calibrating the plurality of visual positioning errors. Other details regarding the laser processing apparatus 200 of the embodiment are illustrated in the descriptions of the visual error calibration method depicted in FIG. 6, so that the detailed description may be referred to the descriptions above, which is not repeated therein.

Referring to FIG. 2 again, the laser processing apparatus 100 of the embodiment is similar to the laser processing apparatus 200 depicted in FIG. 7, where the difference between the two embodiments will be described as follow. In the embodiment, the laser processing apparatus 100 further has a movable platform 150 located in the working area WA, and the movable platform 150 is electrically connected to the control unit 160. To be specific, the method for the control unit 160 of the laser processing apparatus 100 respectively and relatively moving the alignment mark AP and the alignment mark image PI in sequence, further includes that controlling the movable platform 150 to move relative to the working area WA, and thus may be further configured to execute the steps S110, S120, S130, S140, S150 and complete the tables depicted in FIG. 4D and FIG. E. Other related details are illustrated in the afore-described descriptions depicted in FIG. 1, so that the detailed description may be referred to the descriptions above, which is not repeated therein.

In summary, the visual error calibration and the laser processing apparatus of the disclosure are capable of producing the alignment table belonging to the working area through respectively and relatively moving the alignment mark and the alignment mark image formed thereof to the plurality of positions on the working area and the visible area in sequence and recording the related parameters for ease of subsequent reference, and accordingly calibrating the plurality of visual positioning errors.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A visual error calibration method, configured to calibrate a plurality of visual positioning errors of a laser processing apparatus, and the visual error calibration method comprising:
    (a) providing an alignment mark, wherein the alignment mark has at least one alignment point;
    (b) locating a preset point of the alignment mark at a first preset position of a working area, forming an alignment mark image on a visible area of an image sensing unit corresponding to the alignment mark, and locating a preset image point folliied by the preset point on the visible area at a preset position of the visible area, wherein the working area has a plurality of second preset positions;
    (c) locating the at least one alignment point of the alignment mark at one of the second preset positions;
    (d) adjusting a plurality of parameters of a scanning module to cause an alignment image point formed by the at least one alignment point on the visible area to locate at the preset position of the visible area, and recording the parameters of the scanning module; and
    (e) relatively moving the alignment image point to a plurality of positions on the visible area in sequence, and respectively recording the positions of the alignment image point in the visible area, the positions of the alignment point in the working area and the parameters of the scanning module, so as to produce an alignment table belonging to the working area,
    wherein step (b) comprises:
        locating the preset point of the alignment mark at the first preset position of the working area; and
        adjusting an angular parameter of a beam splitter to cause the preset image point formed by the preset point on the visible area to locate at the preset position of the visible area.

2. The visual error calibration method according to claim 1, wherein step (a) comprises:
    utilizing a laser light source to process on a laser processing sample sheet, so as to form the alignment mark.

3. The visual error calibration method according to claim 1, wherein the alignment mark is located on a movable platform of the working area.

4. The visual error calibration method according to claim 3, wherein step (c) comprises:
    moving the movable platform relative to the working area.

5. The visual error calibration method according to claim 3, wherein step (e) comprises:
    moving the movable platform relative to the working area.

6. The visual error calibration method according to claim 1, wherein the at least one alignment point is a plurality of alignment points, the alignment points are respectively located on a plurality of alignment sub-marks of the alignment mark, and the alignment sub-marks are symmetrically distributed on a calibration sample sheet.

7. The visual error calibration method according to claim 6, wherein each of the alignment points is a center of each of the alignment sub-marks.

8. The visual error calibration method according to claim 7, further comprising a return-to-zero calibration step before executing step (a), and the return-to-zero calibration step comprising:
    forming a return-to-zero alignment mark on a laser processing sample sheet;
    locating a calibration point of the return-to-zero alignment mark at the first preset position of the working area; and
    adjusting an angular parameter of a beam splitter to cause a calibration image point formed by the calibration point on the visible area to locate at the preset position of the visible area.

9. The visual error calibration method according to claim 8, wherein the calibration point is a center of the return-to-zero alignment mark.

10. The visual error calibration method according to claim 6, wherein the visual error calibration method before executing step (b) further comprising:
adjusting the parameters of the scanning module to cause each alignment point of each alignment sub-mark on the calibration sample sheet along a fixed direction to respectively form each of the alignment image points in sequence within the visible area; and
adjusting an angle of the calibration sample sheet and adjusting the parameters of the scanning module, so that a connection of the alignment image points entered the visible area in sequence is substantially parallel to a coordinate axis direction of the visible area.

11. The visual error calibration method according to claim 6, wherein step (c) comprises:
adjusting the position of the calibration sample sheet, so that each of the alignment points is coincided with each of the second preset positions in the working area.

12. The visual error calibration method according to claim 6, wherein step (e) comprises:
adjusting the parameters of the scanning module.

13. The visual error calibration method according to claim 1, wherein the scanning module comprises a focus mirror and two reflective mirrors, and the parameters of the scanning module are angular parameters or positional parameters of the reflective mirrors.

14. The visual error calibration method according to claim 1, wherein the preset point, the first preset position and the preset position respectively are centers of the alignment mark, the working area and the visible area, and the alignment point is the center of the alignment mark.

15. The visual error calibration method according to claim 1, wherein the working area is divided into a plurality of working sub-areas arranged in array, and the visual error calibration method repeatedly execute step (c), step (d) and step (e) several times, the second preset positions are different from each other among step (c) repeated several times, so as to complete an alignment table belonging to each of the working sub-areas and collect to the alignment table belonging to the working area.

16. The visual error calibration method according to claim 15, wherein each of the second preset positions is a center of each of the working sub-areas.

* * * * *